(12) United States Patent
Guidetti et al.

(10) Patent No.: US 11,497,194 B2
(45) Date of Patent: Nov. 15, 2022

(54) ADAPTIVE HARNESS

(71) Applicant: DUO TECHNICAL GEAR LLC, Pasadena, CA (US)

(72) Inventors: Giovanni Guidetti, Canoga Park, CA (US); Gaganraj Rihal, Pasadena, CA (US)

(73) Assignee: Duo Technical Gear, LLC, Pasadena, CA (US)

( * ) Notice: Subject to any disclaimer, the term of this patent is extended or adjusted under 35 U.S.C. 154(b) by 46 days.

(21) Appl. No.: 17/005,068

(22) Filed: Aug. 27, 2020

(65) Prior Publication Data

US 2021/0059216 A1 Mar. 4, 2021

Related U.S. Application Data

(60) Provisional application No. 62/972,712, filed on Feb. 11, 2020, provisional application No. 62/892,518, filed on Aug. 27, 2019.

(51) Int. Cl.
*A01K 27/00* (2006.01)

(52) U.S. Cl.
CPC .................. *A01K 27/002* (2013.01)

(58) Field of Classification Search
CPC .... A01K 27/002; A01K 27/00; A01K 27/001; A01K 27/003
See application file for complete search history.

(56) References Cited

U.S. PATENT DOCUMENTS

| | | | | |
|---|---|---|---|---|
| 5,335,627 A * | 8/1994 | Bandimere | .......... | A01K 27/002 119/856 |
| 5,370,083 A * | 12/1994 | Sporn | .................. | A01K 27/002 119/905 |
| 5,611,298 A * | 3/1997 | Sporn | .................. | A01K 27/002 119/864 |
| 6,708,650 B1 * | 3/2004 | Yates | .................... | A01K 27/002 119/818 |
| 2008/0047501 A1 * | 2/2008 | Madere | ................ | A01K 27/002 119/856 |
| 2015/0007778 A1 * | 1/2015 | Yamin | .................. | A01K 27/002 119/863 |
| 2017/0265437 A1 * | 9/2017 | Sporn | .................. | A01K 27/002 |

* cited by examiner

*Primary Examiner* — Kristen C Hayes
(74) *Attorney, Agent, or Firm* — Timothy J. Bortree

(57) ABSTRACT

An adaptive harness includes a neck girth loop and a torso girth loop. Each loop has lateral arcs on opposite sides of and extending in directions substantially parallel to a sagittal plane. Each of the lateral arcs has an adjustable length. The loops are connected to one another ventrally and dorsally. The harness further includes a tension force transfer path that extends circumferentially along the neck girth loop from a tension force redirector, or ring, on the neck girth loop in the sagittal plane through the lateral arcs of the neck girth loop. The harness further includes a tension force conduit, or strap, secured along the path. When a tension force is applied to the strap outwardly from the ring, such as the pulling of a leash attaching to a leash coupling on the strap, the lengths of the lateral arcs of the neck girth loop are shortened, resulting in a better fit of the harness to the subject.

19 Claims, 14 Drawing Sheets

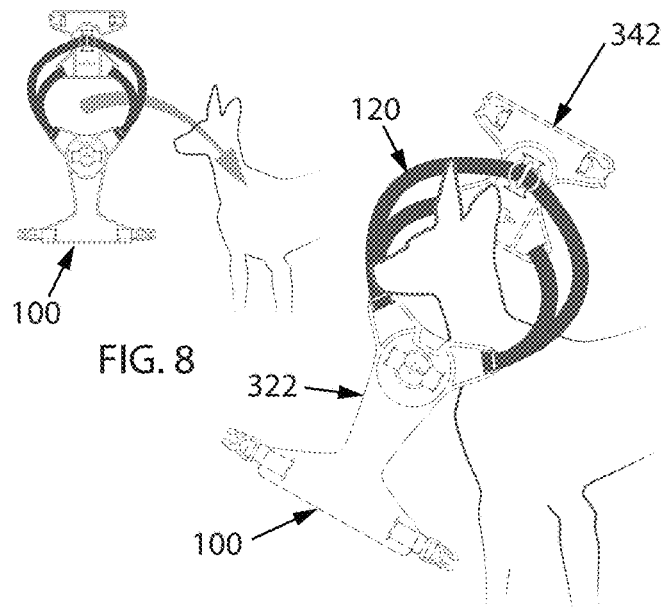
FIG. 8
FIG. 9
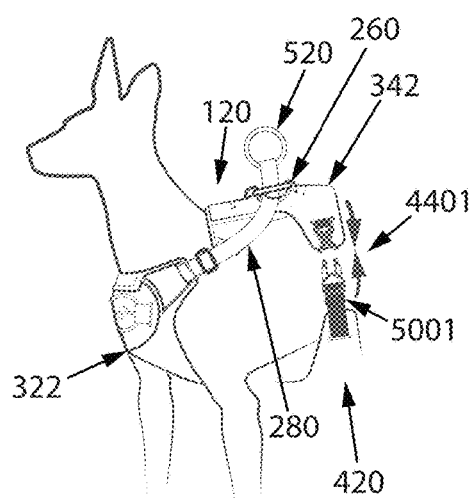
FIG. 10
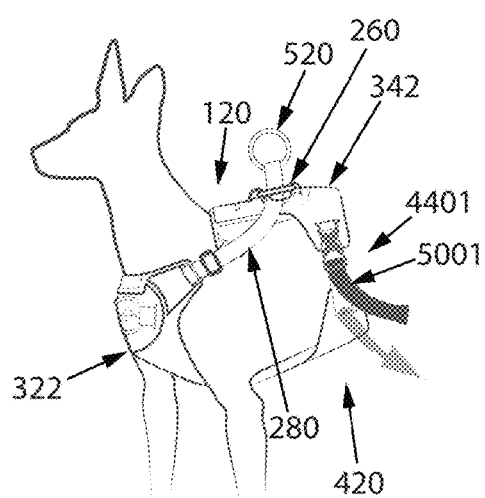
FIG. 11
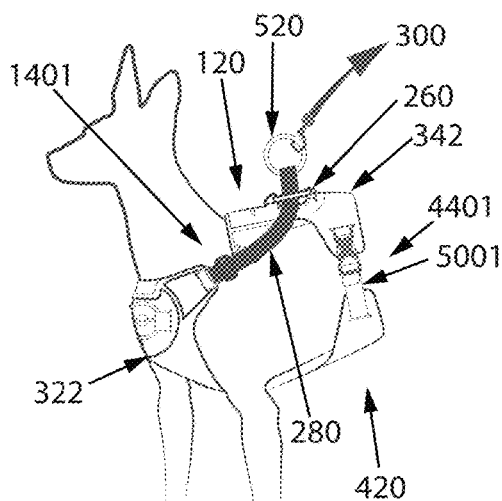
FIG. 12

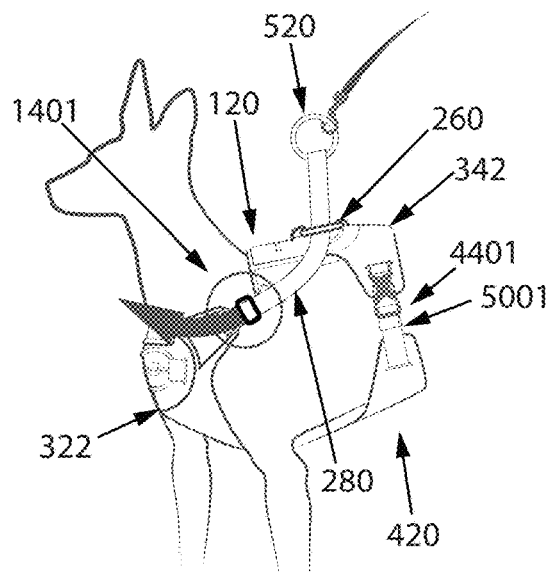
FIG. 13
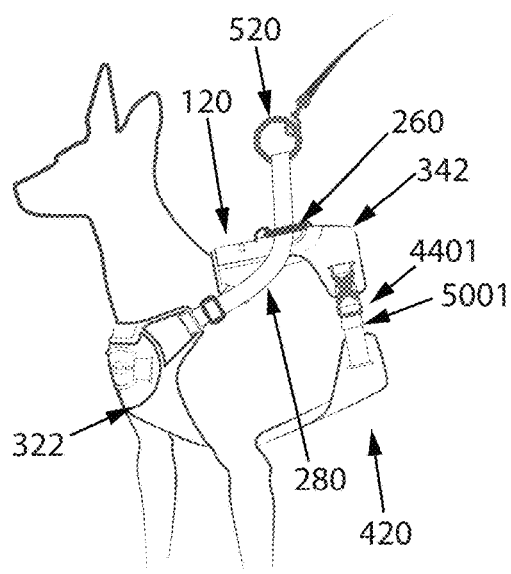
FIG. 14
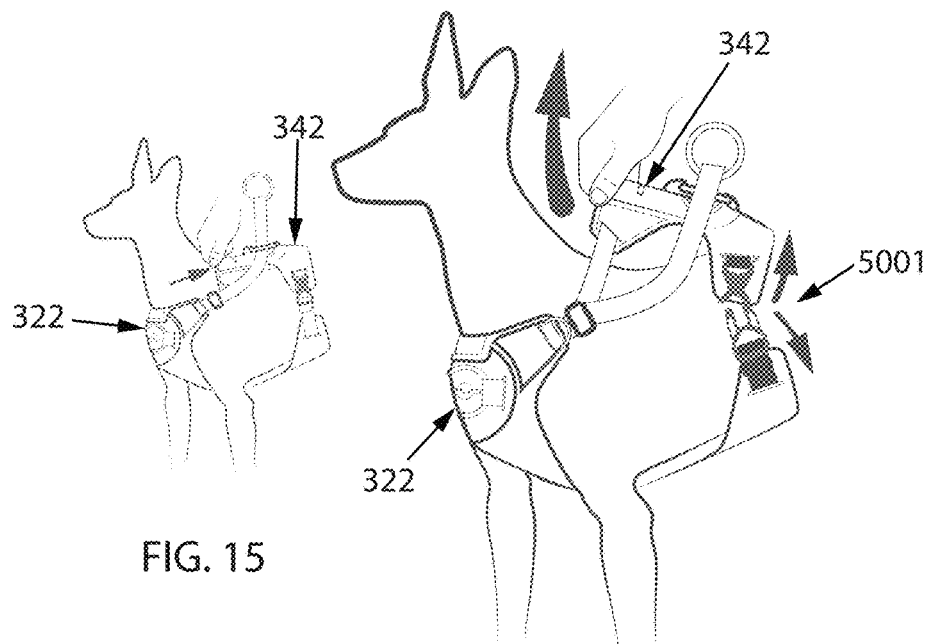
FIG. 15
FIG. 16

ADAPTIVE HARNESS

FIELD OF THE INVENTION

The invention relates generally to restraint and control equipment, and more specifically to harnesses for dogs and other animals.

CROSS REFERENCE TO RELATED APPLICATIONS

The present application claims priority from the following U.S. Provisional Applications, the entire disclosures of which, including but not limited to any and all cited references, are incorporated herein by reference: U.S. Provisional Application Nos. 62/892,518 (filed Aug. 27, 2019) and 62/972,712 (filed Feb. 11, 2020).

BACKGROUND OF THE INVENTION

Traditional dog harnesses have been used to give the handler increased control over a dog's body by holding a significant portion of the dog's upper torso in a woven covering secured by webbing straps. The harnesses are typically attached to a leash from the back.

The fit of these harnesses is static or fixed. That is, once initial adjustments are made to fit the harness to the dog's body, the harness does not tighten or loosen during activity. Therefore, because the circumference of a dog's head is usually not much larger than the base of the dog's neck, the harness, even with a proper fit, is not completely secure on the dog's body.

Such circumstances result in several problems. The dog can back out of the harness or at least disrupt its proper configuration, putting the safety of the dog and the handler at risk. The handler experiences weak feedback from the leash and poor control over the dog's body, resulting in frustration for the handler and the dog, and a reduced ability to train and be trained.

Adjusting the fit on traditional harnesses does not solve the problems. On a tighter setting, a static fit can interfere with range of motion, gait, breathing, and overall comfort. Current harnesses utilize either a three- or four-point adjustment system with triglides or ladder-locks that require both hands for adjustment. Further, each strap and anchor point assembly adjusts only the slack or length of its respective region of the harness. These traditional fit systems make strap adjustment uneven, difficult, and time consuming, which results in less-than-optimal fitting in real world scenarios.

Even the best current fit systems can be adjusted only to a resting dog and the position and contours of the dog's body as it waits for the harness to be adjusted. However, once the harness is attached and fitted, the dog moves, and continues moving during exercise or training, and consequently the positions of its legs, shoulders, and neck change constantly, as do the contours of the dog's body in those areas as the dog's muscles flex. When the harness then inevitably shifts from its optimal fit configuration, the aforementioned problems arise.

Accordingly, there is a need for a harness that provides a better fit under real world use conditions.

SUMMARY OF THE INVENTION

The invention advantageously fills the aforementioned deficiencies by providing an adaptive harness and methods for use thereof.

The following descriptions of features and aspects of the invention are not meant to limit the scope of the invention, but rather to merely provide examples of preferred embodiments. Terms and phrases used are intended to have and convey their dictionary and common usage meanings, as well as or including, without limitation, the meanings specified. Terms and phrases used to convey direction or position, whether relative or absolute, are merely examples and do not limit the invention to only those directional or positional terms and phrases used, but rather the invention encompasses embodiments having components or features that are directed or positioned differently. To the extent that any refer to functionality or purpose in any way, they are intended to convey, in addition to their dictionary and common usage meanings, any arrangement, combination, or interaction of physical objects, hardware, and/or software that is suitable to any degree, whether partially or fully, for accomplishing and/or effecting the function or intended result. Further, in addition to any preferred embodiments described, the invention encompasses embodiments having features and aspects that fall into the broadest possible categories to which the described preferred features and aspects belong.

In preferred embodiments, an adaptive harness of the invention dynamically adjusts its fit to a subject, such as a dog, wearing the harness, under a tension force applied by movement of the subject to a leash connected to a strap, or other tension force conduit, that wraps around the harness through a series of rings, or other redirectors, that redirect the tension force to pull two parts of the harness toward one another to tighten the fit. Preferably, as the dog pulls on the leash in any direction, the harness tightens, and thereby prevents escape and enhances control of the dog. Further preferably, when the dog relaxes, the harness loosens, and thereby increases comfort and freedom of movement.

More particularly, in preferred embodiments, the strap is laced through D-rings and O-rings on the harness in a configuration that causes a cinching of the harness, for example, a shortening of the distance between, for example, separate dorsal and ventral pads of the harness, when the strap is pulled by an attached leash. Instead of D-rings and O-rings, other suitable devices can be used.

In a preferred configuration, the strap is attached at one end to a left side of a dorsal pad of the harness, extends down to a D-ring on the left side of the ventral pad of the harness, through the D-ring and back up to an O-ring at the center of the dorsal pad, passes under the O-ring, down to a D-ring on the right side of the ventral pad, through the D-ring and back up to the right side of the dorsal pad and attached there at its other end. The section of the strap that passes under the O-ring passes up through a leash coupling above the O-ring, such that if a leash attached to the leash coupling is pulled in any direction away from the harness, the two branches of the strap pull the D-rings closer to the strap's attachment points, bringing the dorsal pad and ventral pad closer together and accordingly cause them to fit more tightly to the dog.

In other embodiments, instead of the strap being attached to the dorsal pad at two lateral points, it can instead pass continuously on the outside of or through the dorsal pad, and achieve the same or a similar result when the leash is pulled.

In other embodiments, the configuration can be reversed, so that the strap is attached to, or passes on the outside of or through the ventral pad, loops in two branches through D-rings on the dorsal pad, and down to an O-ring at the center of the ventral pad to pass under the O-ring and down through a leash coupling on the outside of the O-ring, such that if a leash attached to the leash coupling is pulled in any direction away from the harness, the two branches of the strap pull the D-rings closer to the strap's attachment points, bringing the dorsal pad and ventral pad closer together and accordingly cause them to fit more tightly to the dog. This configuration allows input and control from the chest of the dog and can be a configuration that is effective to discourage the dog from pulling.

In other embodiments, the configuration can have both a dorsal O-ring and a ventral O-ring, so that both are available for use in dynamically adjusting the fit. In some of such embodiments, for example, the strap is not attached to either pad, but rather is secured to itself to form a continuous conduit that passes from one O-ring, around, on one side of the dog, to the distal pad, loops back to the proximal pad, loops back to the distal pad and on to and under the other O-ring, then up, around the other side of the dog, to the proximal pad, loops back to the distal pad, loops back to the proximal pad and on to and back under the O-ring at the start. At each O-ring, the strap passes outwardly through the O-ring and through a leash coupling on the outside of the O-ring.

For example, in some of such embodiments, starting at the dorsal O-ring, the strap forms a continuous conduit that passes from the dorsal O-ring, around, on one side of the dog, to a D-ring on the ventral pad, loops back to a D-ring on the dorsal pad, loops back to the ventral pad and on to and under the ventral O-ring, then up, around the other side of the dog, to a D-ring on the dorsal pad, loops back to a D-ring on the ventral pad, loops back to the dorsal pad and on to and back under the dorsal O-ring. At each O-ring, the strap passes outwardly through the O-ring and through a leash coupling on the outside of the O-ring.

Therefore, if a leash attached to either leash coupling is pulled in any direction away from the harness, the straps pull the left lateral D-rings closer to each other and the right lateral D-rings closer to each other, bringing the dorsal pad and ventral pad closer together and accordingly cause them to fit more tightly to the dog.

The exact locations of attachment points and attachment rings can be varied without departing from the scope of the invention.

In certain embodiments, the described dynamic tightening, or cinching, configuration is located about a neck girth of the dog, such that a loop about the neck girth of the dog is provided effectively with a dynamically adjustable circumference. In some embodiments, the described dynamic tightening, or cinching, configuration is located about a torso girth of the dog, such that a loop about the torso girth of the dog is provided effectively with a dynamically adjustable circumference.

In some embodiments, more than one dynamically adjustable circumference can be provided, whether about the neck girth of the dog, a torso girth of the dog, or elsewhere. In some embodiments, a plurality of loops can be provided that are separated except for converging to a single point of redirection or control. For example, a neck girth loop and a torso girth loop can be provided such that their ventral portions are separate (with the neck girth loop passing under the dog in front of the legs, and the torso girth loop passing under the dog behind the legs) but their dorsal portions converge to a single O-ring, or other redirector, on the harness at a point on the dog's back. Or, for example, a neck girth loop and a torso girth loop can be provided such that their dorsal portions are separate (with the neck girth loop passing over the dog behind the neck, and the torso girth loop passing over the dog about the back) but their ventral portions converge to a single O-ring, or other redirector, on the harness at a point on the dog's chest in front of the legs.

In certain embodiments, one or more girth loops have a dynamically adjustable circumference, and one or more girth loops do not have a dynamically adjustable circumference. The one or more girth loops without a dynamically adjustable circumference can have a manually adjustable circumference and, preferably, serve as additional support for the one or more girth loops having a dynamically adjustable circumference. For example, in a preferred embodiment, the harness has a neck girth loop with a dynamically adjustable circumference and a torso girth loop with a manually adjustable circumference, and the two loops are within a harness having a dorsal pad and a ventral pad, with the neck girth loop having a circumference in front of the dog's front legs and the torso girth loop having a circumference behind the dog's front legs.

In preferred embodiments, the dorsal redirector or ventral redirector, or both, includes a lock through which the strap passes prior to passing through the leash coupling. That is, the strap, approaching from one side of the dog, enters one side of the O-ring, passes through one side of the lock, passes through the leash coupling, then passes through the other side of the lock, then passes through the other side of the O-ring out to the other side of the dog.

Preferably, the lock can be placed in an unlocked configuration and a locked configuration. A lower part of the lock snap fits onto the O-ring from below the O-ring (e.g., the lower part then sits between the dog and the O-ring), and a upper part of the lock snap fits onto the O-ring from above the O-ring (e.g., the O-ring then sits between the dog and the upper part). Each part can be independently snap fitted onto the O-ring, with or without the other part, as the grooves on the lower part that snap onto the O-ring from below are spaced to avoid the grooves on the upper part that snap onto the O-ring from above. The lock is unlocked when the parts are separated (e.g., at least one is not snap fitted onto the O-ring), and the lock is locked when both parts are secured adjacent to one another (e.g., both are snap fitted onto the O-ring). When the lock is unlocked, the strap can move through the lock relative to the lock, and when the lock is locked, the strap cannot move through the lock relative to the lock.

More particularly, in preferred embodiments, the lower part of the lock snap fits onto the O-ring at front and back portions of the O-ring, leaving left and right slots through which the strap passes, and the upper part of the lock snap fits onto the O-ring at left and right portions of the O-ring, restricting entry and exit of the strap into and out from the O-ring and compressing the strap between the lower part and the upper part. Preferably, upwardly directed teeth on the lower part enhance the ability of the lock to prevent movement of the strap through the lock under the compression.

Further particularly, the upper part of the lock is configured to provide additional operational modes of use. Preferably, the upper part of the lock has interior channels that are angled to encourage movement of the strap outwardly (e.g., away from the dog) through the upper part under kinetic forces caused by back and forth lateral movement of the strap relative to the dog while under consistent tension, which the strap would experience under operational use of the harness (e.g., from movement and leash control of the dog). Further preferably, each of the interior channels has an inwardly directed tooth that narrows the channel enough to prevent "back out", or movement in the opposite direction (e.g., toward the dog).

Accordingly, in one additional operational use mode, the upper part of the lock can be snap fitted onto the O-ring without the lower part of the lock being snap fitted onto the O-ring. In this configuration, under frequent kinetic forces as described above, the strap moves an increasing amount through the upper part of the lock without being able to move in the opposite direction, causing a corresponding increasing tightening of the harness, resulting in an optimal fit of the harness to the dog under the specific circumstances. Further, accordingly, optionally, the lower part of the lock can then be snapped onto the O-ring to lock the lock and securely maintain the achieved optimal fit.

Accordingly, in another additional operational use mode, when the lower part of the lock is not snap fitted onto the O-ring, the upper part of the lock can also be not snap fitted onto the O-ring, in which configuration the upper part can be positioned at any point between the O-ring and the leash coupling. In this configuration, under the above described kinetic forces experienced by the strap and the upper part of the lock during operational use of the harness, the upper part "walks down" toward the O-ring. That is, under frequent kinetic forces, the strap moves an increasing amount through the upper part of the lock without being able to move in the opposite direction, causing the upper part to incrementally move toward the dog, resulting in relative positions of the various components of the harness providing increased control of the dog under the specific circumstances.

Further with reference to this operational use mode, the invention contemplates a tension controller, instead of or in addition to a redirector lock, for use with the harness to effect such movement of relative positions of the various components of the harness providing increased control of the dog under the specific circumstances. More particularly, a tension controller having internal channels and teeth configured substantially similarly to the channels and teeth of the upper part of the lock can be positioned at any point between the O-ring and the leash coupling. In such a configuration, under above described kinetic forces that would be experienced by the strap and the tension controller during operational use of the harness, the controller "walks down" toward the O-ring. That is, under frequent kinetic forces, the strap moves an increasing amount through the tension controller without being able to move in the opposite direction, causing the controller to incrementally move toward the dog, resulting in relative positions of the various components of the harness providing increased control of the dog under the specific circumstances.

Further, the invention contemplates that the tension controller can be used with a plurality of harnesses of the invention to provide increased control of multiple dogs. More particularly, the tension controller can accept a tension force conduit with two branches, each branch leading from a respective dog, that each pass through a respective one of the two channels in the controller, converging at a leash coupling on a side of the controller proximal to the handler. In such a configuration, under above described kinetic forces that would be experienced by the strap and the tension controller when handling the dogs, the controller "walks down" toward the dogs. That is, under frequent kinetic forces, each of the branches independently moves an increasing amount through the controller without being able to move in the opposite direction, causing the controller to incrementally move toward the dogs, resulting in the dogs being brought closer and closer together, providing increased control of the dogs under the specific circumstances.

In certain embodiments, an outwardly facing surface of the lock can be configured for use with desired accessories. For example, the outwardly facing surface can be flat and smooth to facilitate the use of adhesives to attach accessories. Or, for example, the outwardly facing surface can be configured with a mount for accessories, including but not limited to smartphones, cameras, and lights.

In preferred embodiments, to facilitate placing the harness on the dog and removing the harness from the dog, the circumference of the neck girth loop can be manually increased to accommodate passing the neck girth loop over the head and neck of the dog (e.g., passing the head and neck of the dog through the neck girth loop). This is preferably accomplished by pulling the dorsal pad and ventral pad away from one another, causing the strap to loosen until the desired opening diameter is reached. In embodiments with a manually adjustable torso girth loop, clips securing the dorsal pad and ventral pad to one another can be opened to accommodate the dog's torso, and closed for operational use of the harness.

The invention now will be described more fully hereinafter with reference to the accompanying drawings, which are intended to be viewed in conjunction with both this summary, the detailed description, and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough and complete and will fully convey the full scope of the invention to those skilled in the art.

BRIEF DESCRIPTION OF THE DRAWINGS

FIGS. 8-16 illustrate installation and removal of a harness of the first preferred embodiment of the present invention.

DETAILED DESCRIPTION OF PREFERRED EMBODIMENTS

Figure 1:
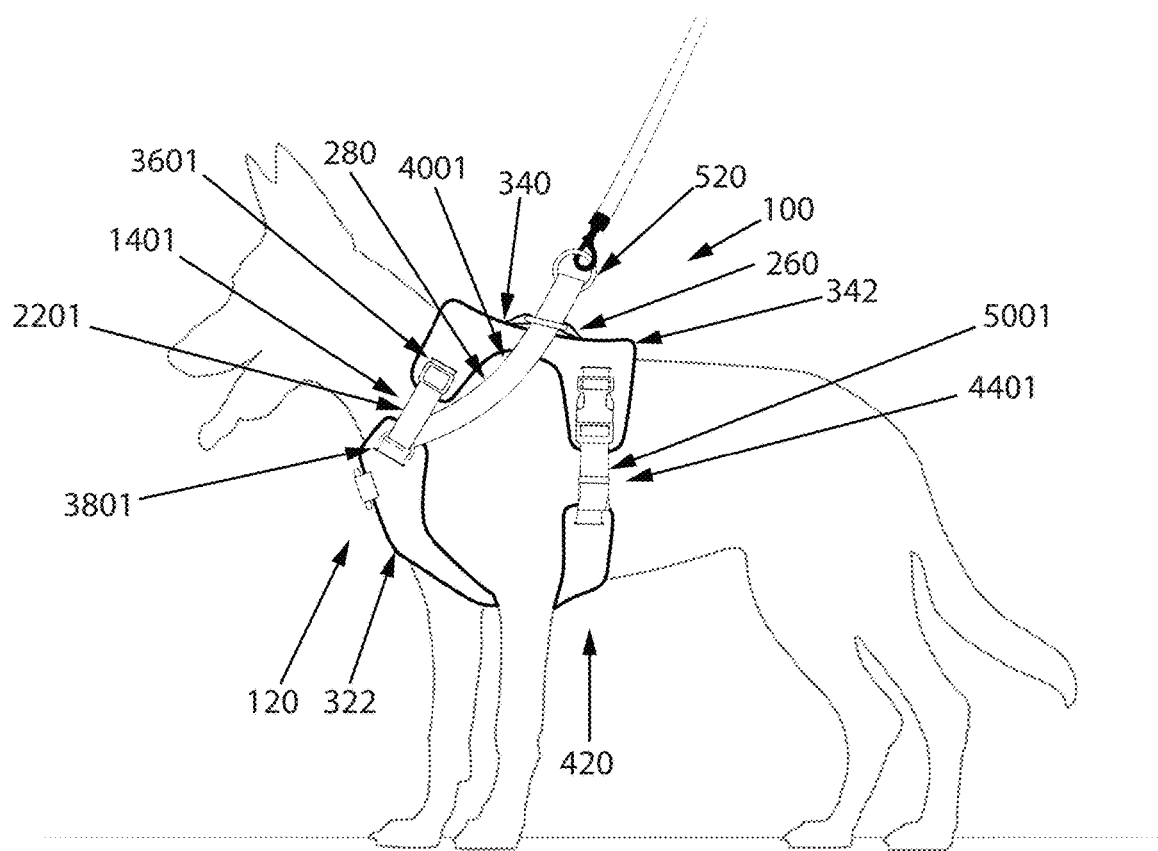
FIGS. 1-3 illustrate a harness of a first preferred embodiment of the present invention, having a dorsal redirector.
Figure 2:
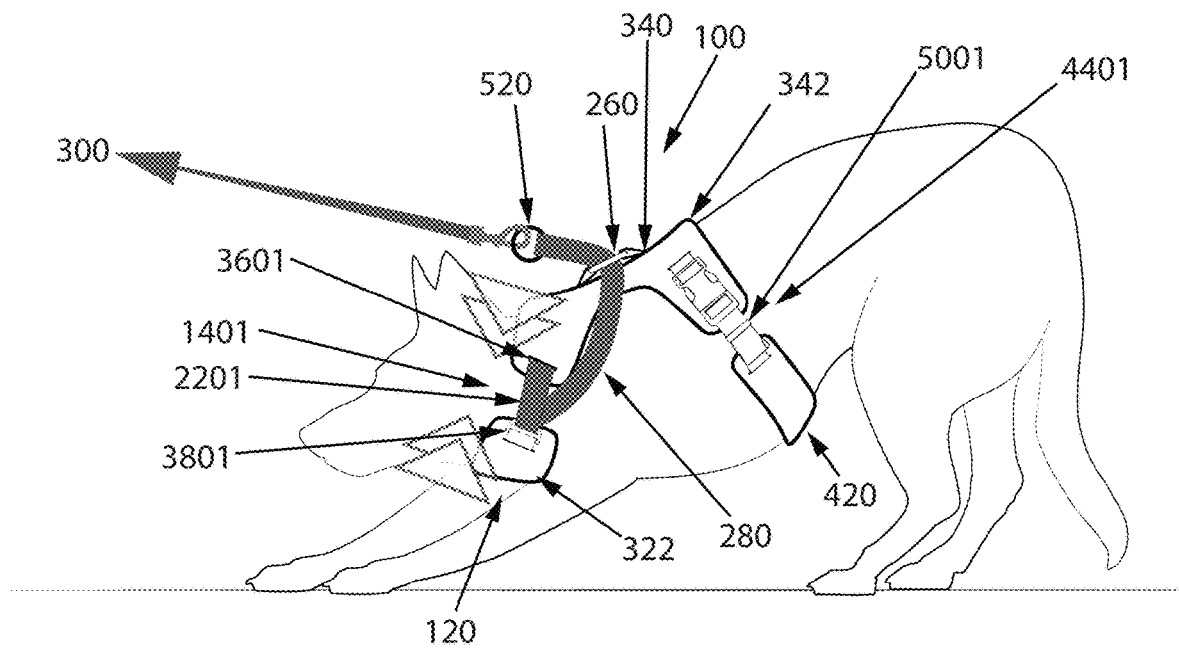
Figure 3:
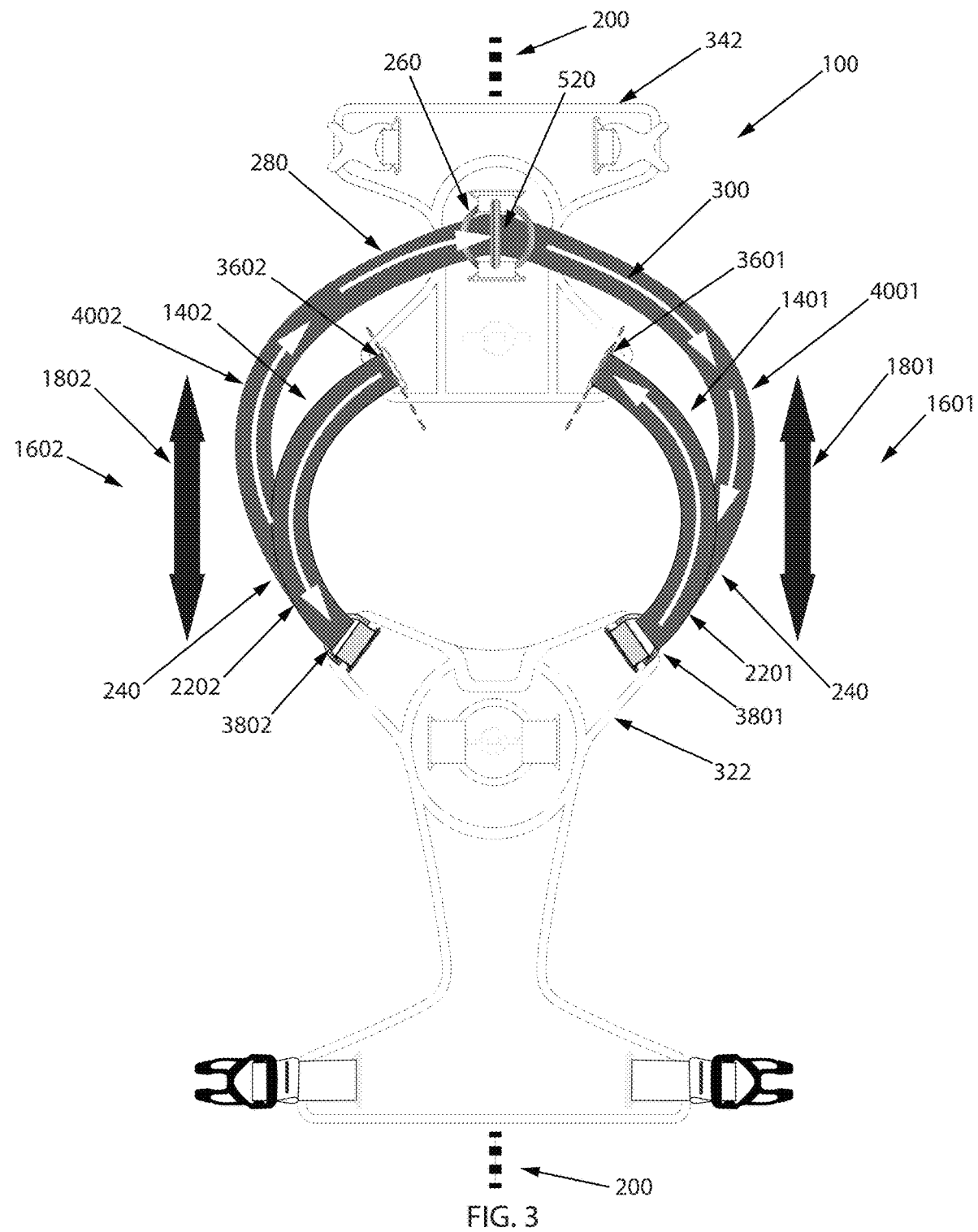
Figure 4:
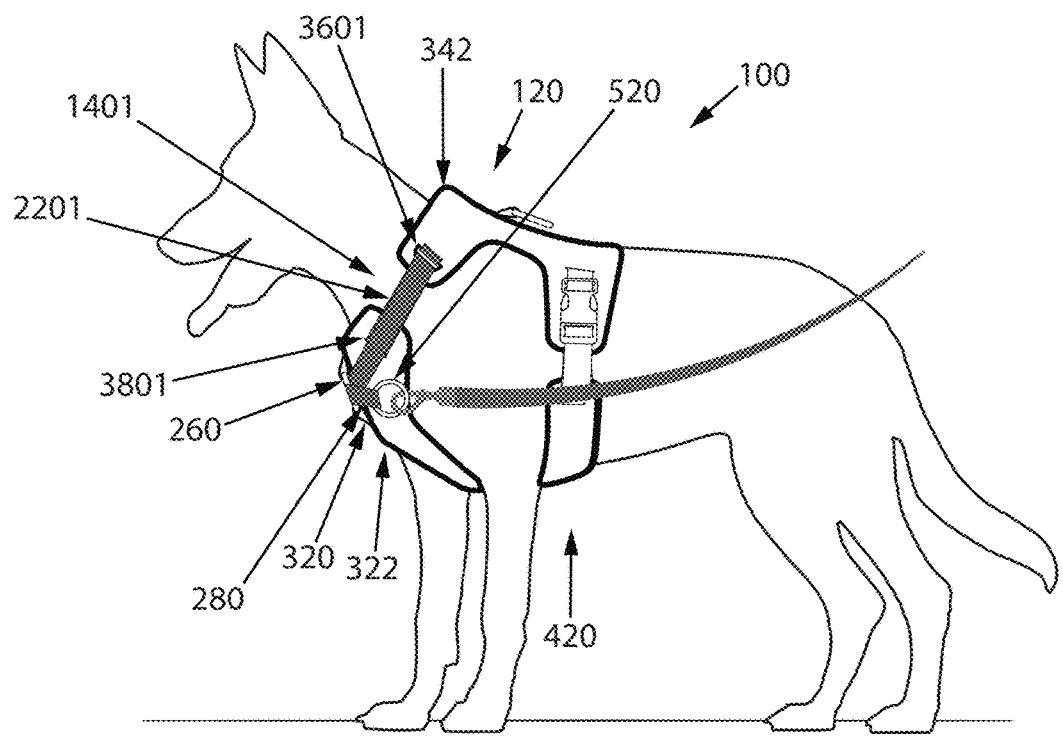
FIGS. 4-6 illustrate a harness of a second preferred embodiment of the present invention, having a ventral redirector.
Figure 5:
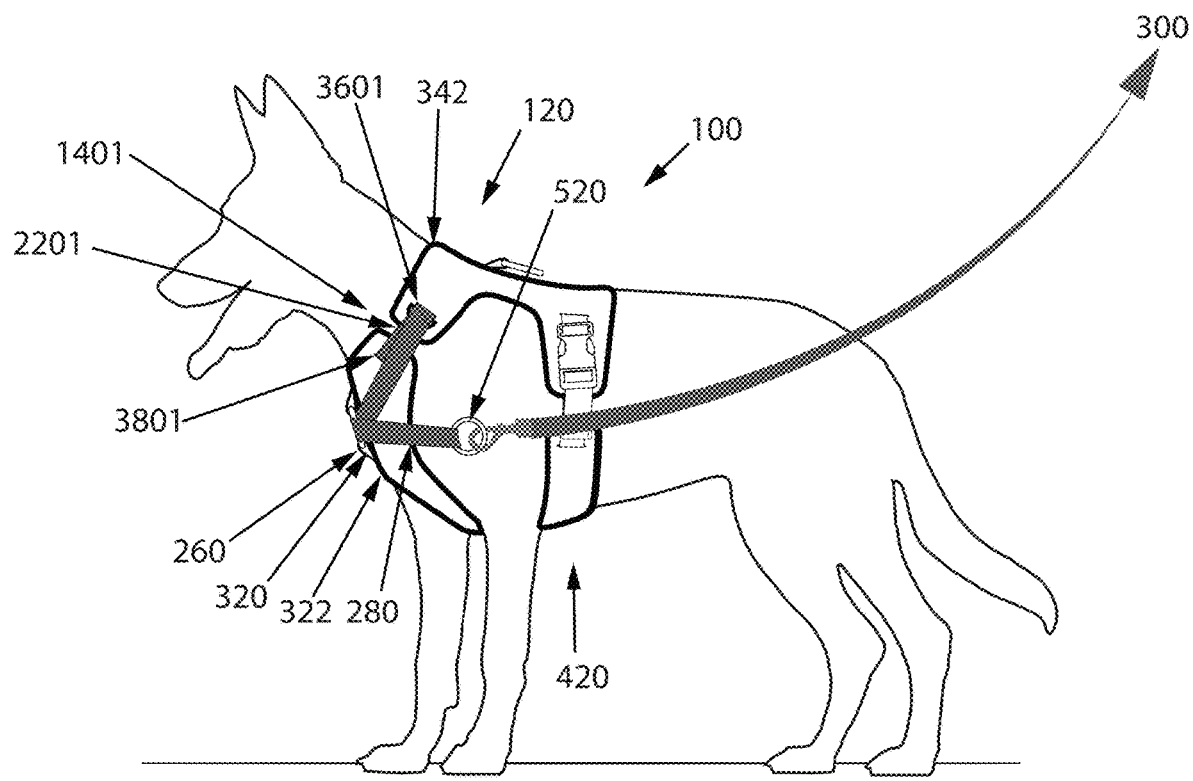
Figure 6:
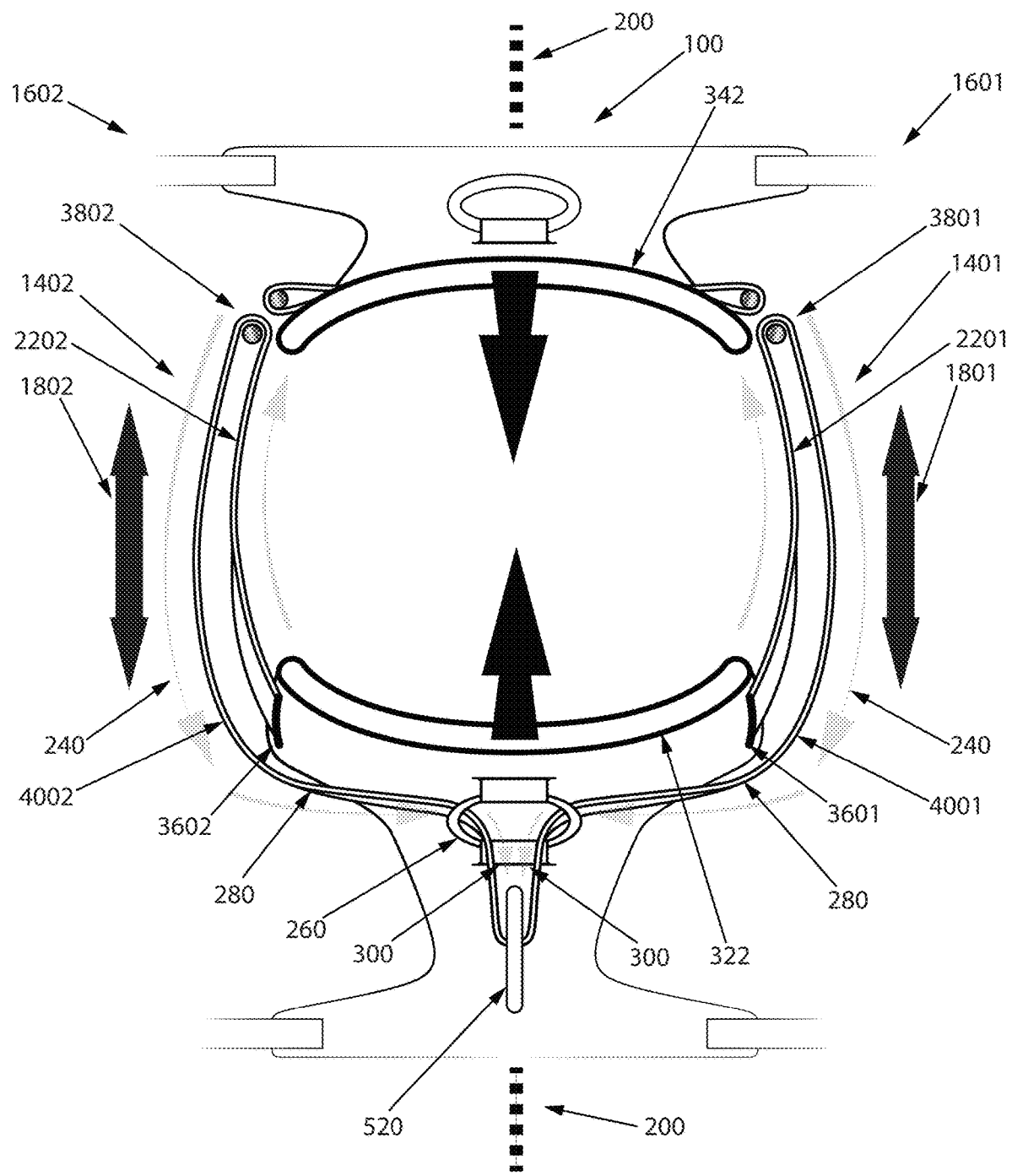
Figure 7:
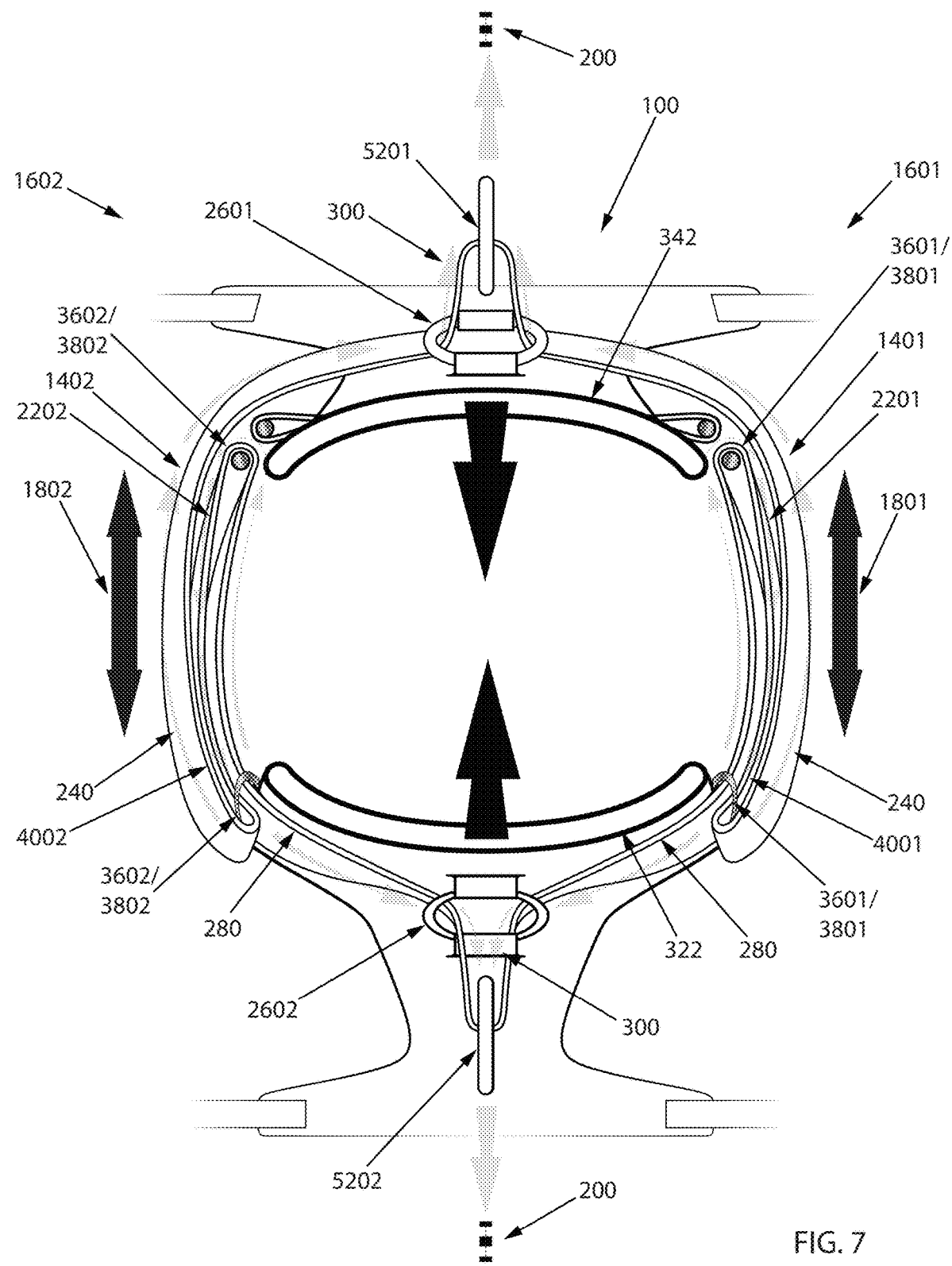
FIG. 7 illustrates a harness of a third preferred embodiment of the present invention, having ventral and dorsal redirectors.
Figure 17:
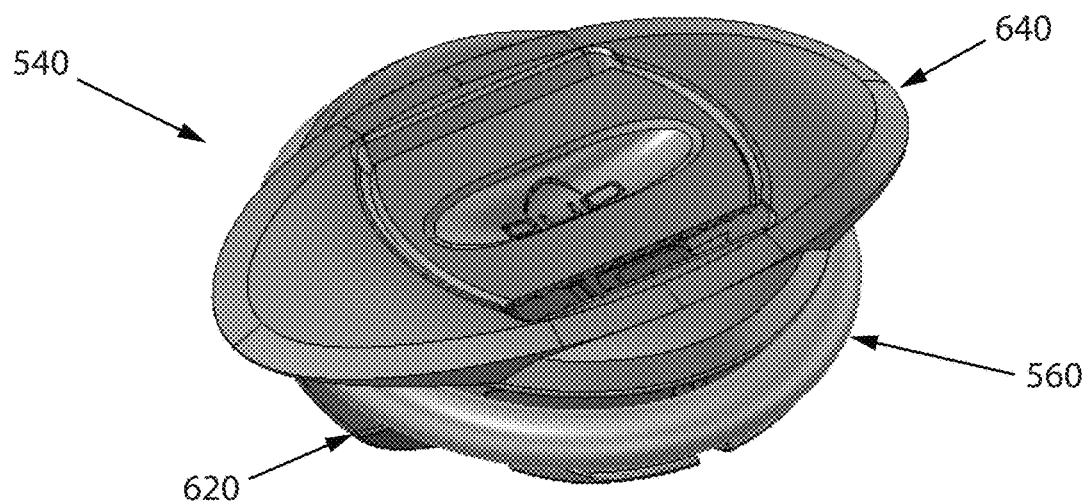
FIGS. 17-19 illustrate a redirector lock of a harness of certain preferred embodiments of the present invention.
Figure 18:
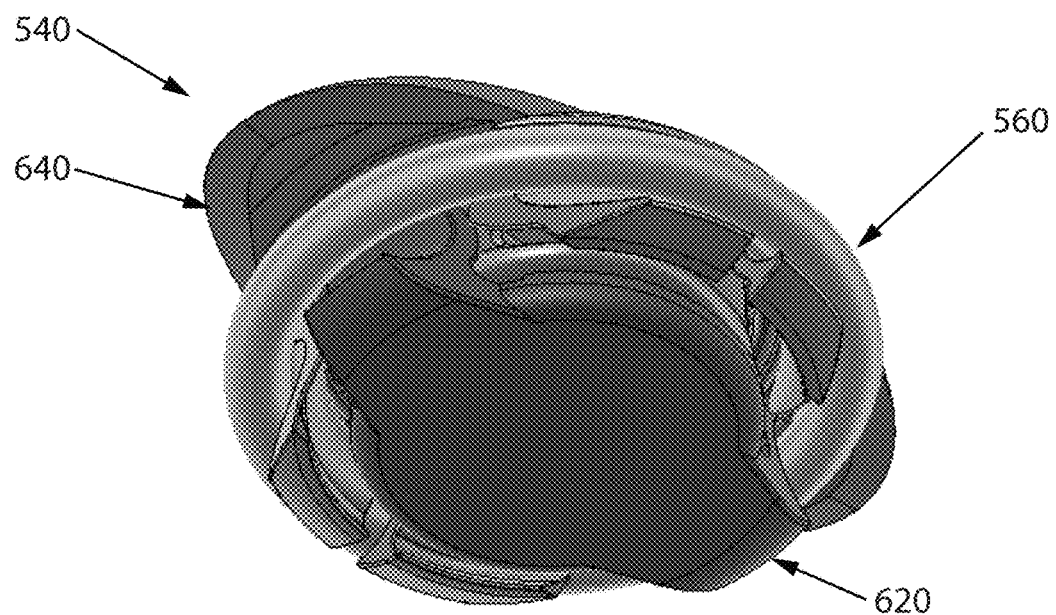
Figure 19:
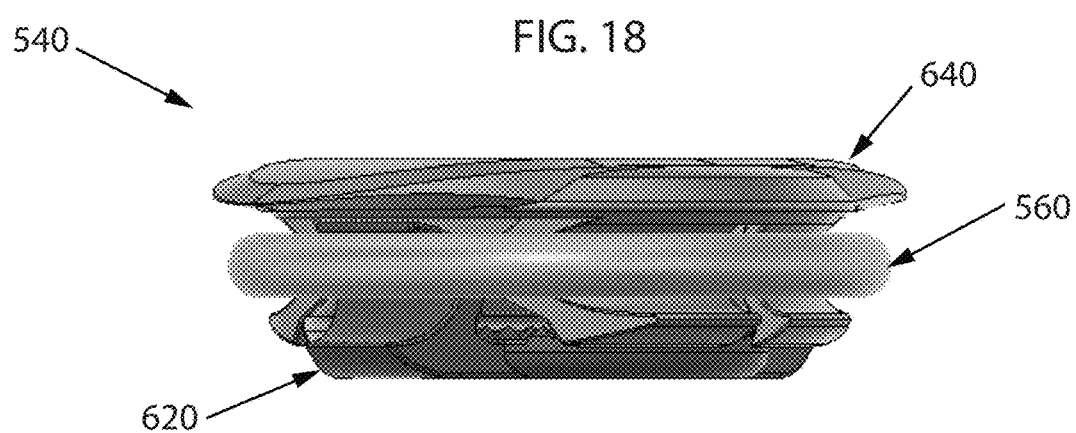
Figure 20:
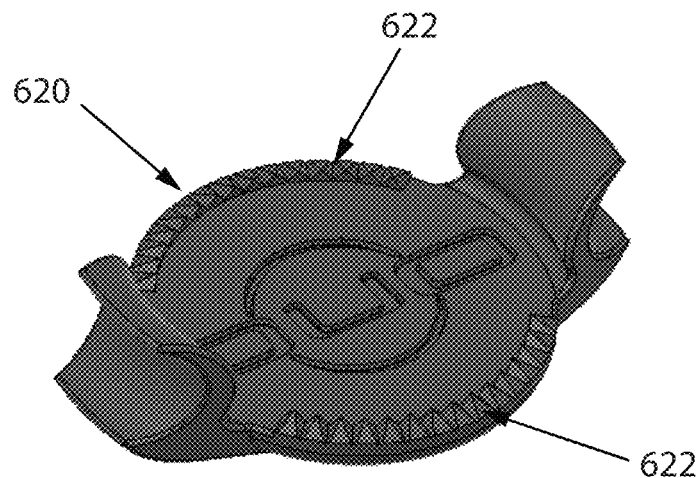
FIGS. 20-21 illustrate a lower part of a redirector lock of a harness of certain preferred embodiments of the present invention.
Figure 21:
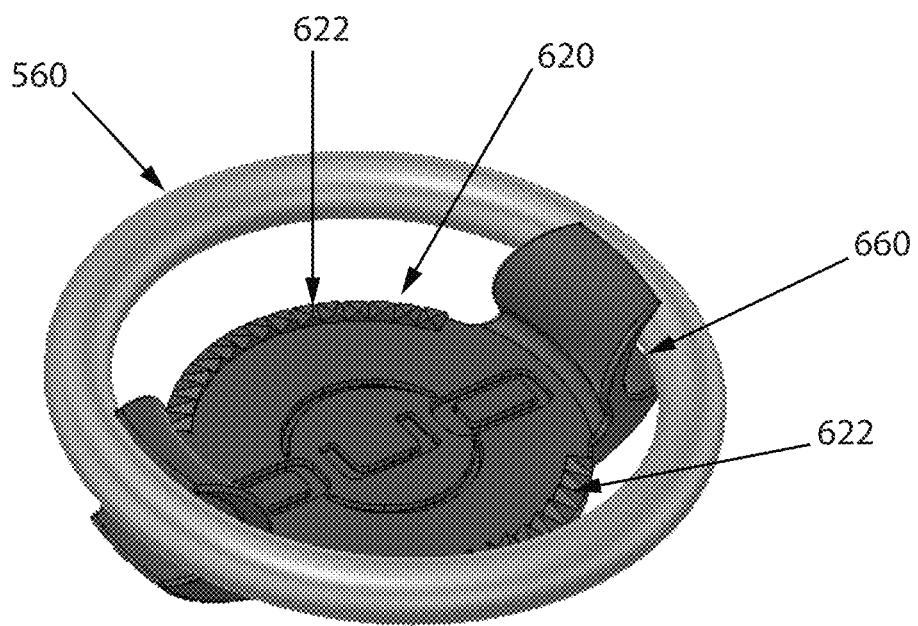
Figure 22:
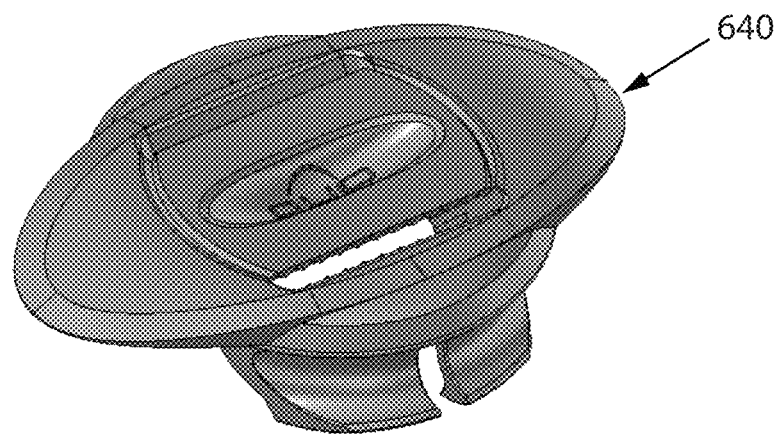
FIGS. 22-24 illustrate an upper part of a redirector lock of a harness of certain preferred embodiments of the present invention, in perspective views.
Figure 23:
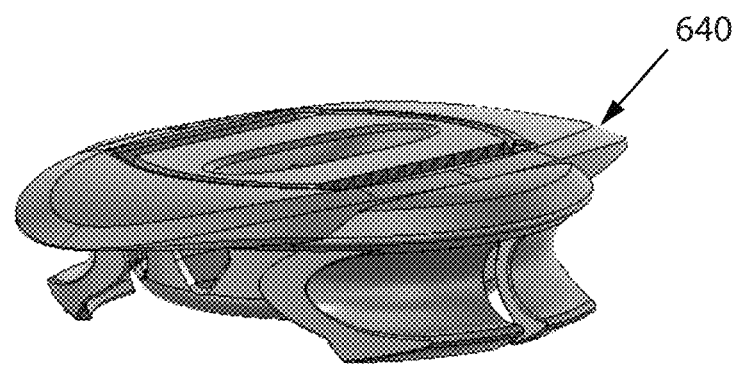
Figure 24:
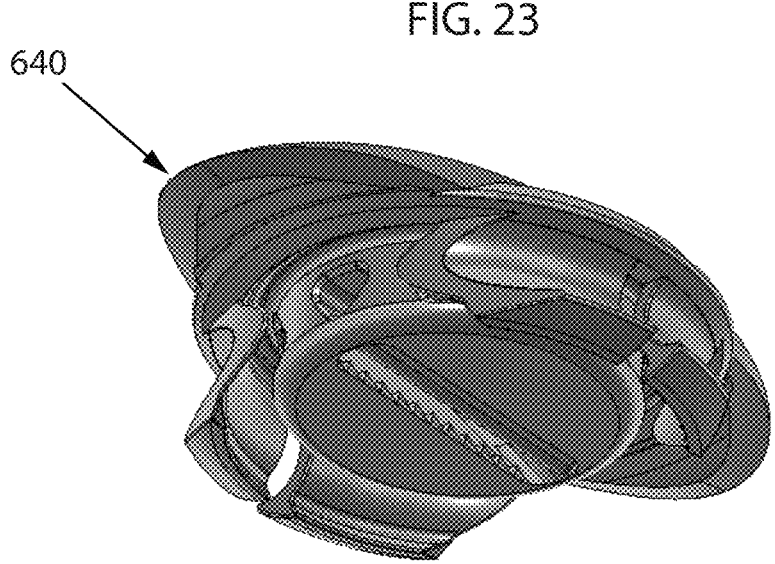
Figure 25:
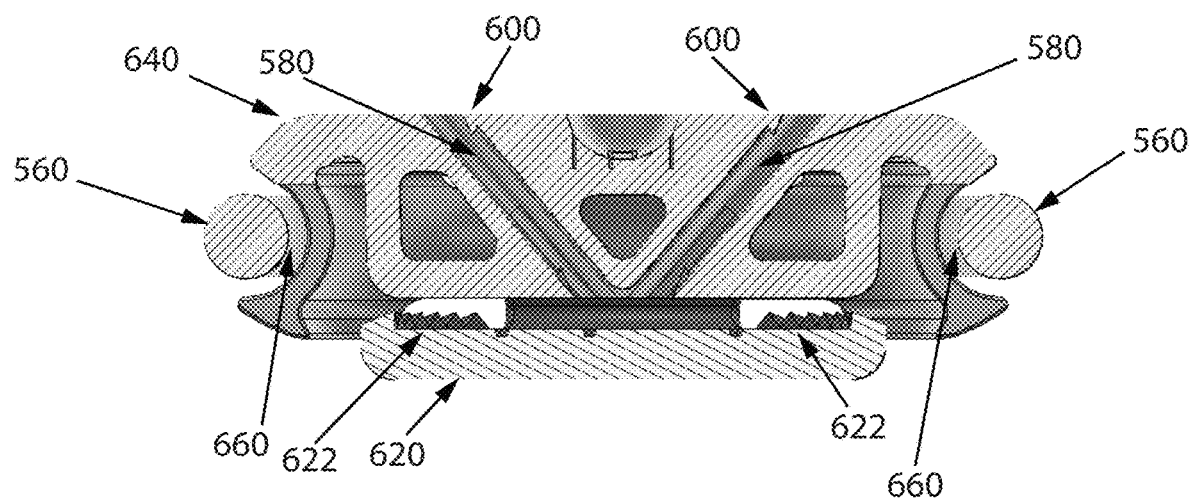
FIGS. 25-26 illustrate an upper part of a redirector lock of a harness of certain preferred embodiments of the present invention, in cross-section views.
Figure 26:
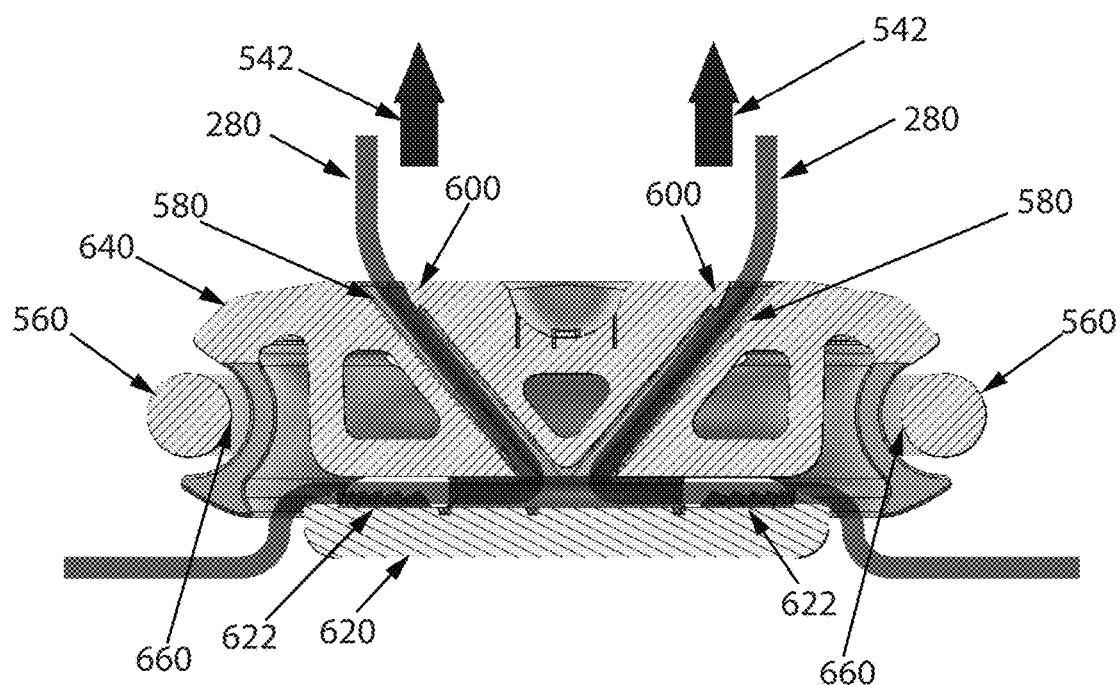

Following are more detailed descriptions of various concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

The invention provides, in preferred embodiments, an adaptive harness.

Referring now to FIGS. 1-33, an adaptive harness 100 of preferred embodiments of the invention is illustrated. In the illustrated embodiments, like numbered elements preferably have like features except as otherwise discussed.

While the illustrated embodiments are shown on a dog, it should be understood that the invention can be used with any subject, whether an animal, human or otherwise, or any other creature or device adapted or otherwise configured to move or behave, in whole or in part, as or similarly to an animal, including but not limited to robots and cybernetic organisms.

In preferred embodiments, the harness has a girth loop. For example, the loop can be a loop of material that surrounds a girth of the subject (e.g., a dog).

In various embodiments, the loop can be a loop, ring, strap, webbing, mesh, vest, coat, brace, or any other suitable structure or device. Further, in various embodiments, the loop can be formed from one component or a plurality of components that, preferably, cooperate with one another. Further, in various embodiments, the material of the loop can be or include nylon, plastic, cloth, rubber, elastic, or any other suitable material that, preferably, is comfortable and strong.

In the illustrated embodiments, the harness 100 has a girth loop 120. The loop 120 surrounds a neck girth of the dog and is defined by a dorsal pad 342 and a ventral pad 322 that are connected to one another by a strap 280. See FIGS. 1-16, especially FIGS. 1, 2, 4 and 5.

Further in preferred embodiments, the loop has lateral arcs on opposite sides of and extending in directions substantially parallel to a sagittal plane. For example, the arcs can be curves of the circumference of the loop that surrounds the girth of the dog.

Two arcs are not required. Embodiments with one arc and embodiments with more than two arcs are also envisioned. Each arc can be of any curvature and any length, and need not have the same curvature or same length as any other arc. The arcs are not required to be laterally positioned on the loop relative to the sagittal plane, directly opposite one another, or symmetrically positioned relative to one another. Rather, in various embodiments, each arc can be positioned anywhere on the loop.

In the illustrated embodiments, the girth loop 120 has lateral arcs 1401,1402 on opposite sides 1601,1602 of and extending in directions (see arrows 1801,1802) substantially parallel to a sagittal plane 200. See FIGS. 1-16, especially FIGS. 3, 6 and 7.

Further in preferred embodiments, each of the arcs has an adjustable length. For example, the length of each arc can be adjusted by shortening or lengthening the distance between the ends of the arc.

Embodiments in which only one arc has an adjustable length, and embodiments in which less than all of the arcs have an adjustable length, are also envisioned. Any manner or mechanism of length adjustment is contemplated by the invention. Any manner or mechanism of shrinking, enlarging, or otherwise changing the circumference of the loop is envisioned.

In the illustrated embodiments, each of the lateral arcs 1401,1402 has an adjustable length 2201,2202. See FIGS. 1-16, especially FIGS. 1-7.

The length of each arc can alternatively or additionally be defined as the distance between two corresponding components of the loop, and adjustment of the length can alternatively or additionally be defined as decreasing, increasing, or otherwise changing the distance. For example, in the illustrated embodiments, the distance between the dorsal pad 342 and the ventral pad 322 on either side of the dog can, respectively, alternatively or additionally be considered the length of the arc on the respective side, with the distances being spanned by a strap 280.

Further in preferred embodiments, the harness has a tension force transfer path extending circumferentially along the loop from a tension force redirector on the loop in the sagittal plane, through the arcs. For example, the path can be within the loop components. Further, for example, the redirector can be a ring secured to the loop in the sagittal plane. Further, for example, the redirector, being secured to the loop, can change the direction of an applied tension force from being within the sagittal plane to being along the curvature of the loop, including through the arcs, and vice versa.

In various embodiments, the path can be any continuous physical connection through one or more objects or materials along which an applied tension force will be transferred. Further, in various embodiments, the redirector can be any object, device, or mechanism that actively or inherently redirects or otherwise changes or causes a change in the direction of a tension force. Further, in various embodiments, the redirector can be located on the loop in a position other than in the sagittal plane.

In the illustrated embodiments, the harness 100 further includes a tension force transfer path 240 that extends circumferentially along the loop 120 from a tension force redirector 260 on the girth loop 120 in the sagittal plane 200 through the arcs 1401,1402. The path 240 is within the loop components, including the dorsal pad 342, ventral pad 322, and a strap 280. See FIGS. 1-16, especially FIGS. 3 and 6.

Further in preferred embodiments, the harness has at least one tension force conduit secured along the path. For example, the conduit can be a strap that is secured at points along the path.

In various embodiments, the conduit can be a strap, webbing, band, rope, or any other tension bearing device or feature. Further, in various embodiments, the conduit can be secured along the path at one point, or any other number of points. Further, in various embodiments, the conduit can be secured in any suitable manner along the path, including without limitation, using stitching, rings, hooks, adhesive, clips, clamps, or any combination of the foregoing.

In the illustrated embodiments, the harness 100 further includes a tension force conduit 280 secured along the path 240. The conduit 280 is a strap that is secured at certain points along the path 240. See FIGS. 1-16, especially FIGS. 3, 6 and 7.

Further in preferred embodiments, when a tension force is applied to the conduit outwardly from the redirector, the lengths of the arcs are shortened. For example, when the conduit is pulled outwardly through the redirector away from the dog, the tension force passes through the conduit and pulls the harness components together.

In various embodiments, the tension force can be applied within the sagittal plane or angled with respect to the sagittal plane. That is, in various embodiments, the conduit can be pulled outwardly from the redirector in any direction to cause the lengths of the arcs to be shortened.

In the illustrated embodiments, when a tension force 300 is applied to the conduit 280 outwardly from the redirector 260, the lengths 2201,2202 of the arcs 1401,1402 are shortened. When the conduit 280 is pulled outwardly through the redirector 260 away from the dog, the tension force 300 passes through the strap 280 and pulls the dorsal pad 342 closer to the ventral pad 322. See FIGS. 1-16, especially FIGS. 1-7.

The arc shortening feature of the harness will be described in greater detail below, as it relates to, for example, the locations at which, and the manner in which, the conduit is secured along the path.

Preferably, in certain embodiments, the redirector is located at a ventral portion of the loop or a dorsal portion of the loop. For example, the redirector can be a ring that is secured to a ventral portion of the loop or a dorsal portion of the loop.

Other configurations are also contemplated. Embodiments having one or more redirectors are contemplated. In various embodiments, the location of the one or more redirectors can be at a ventral portion of the loop, a dorsal portion of the loop, or another portion of the loop, and can be in the sagittal plane or outside the sagittal plane.

In the first illustrated embodiment, the redirector 260 is located at a dorsal portion 340 of the loop 120, in the sagittal plane 200. In a second, alternate, illustrated embodiment, the redirector 260 is located at a ventral portion 320 of the loop 120, in the sagittal plane 200. In a third, other alternate, illustrated embodiment, a first redirector 2601 is located at a ventral portion 320 of the loop 120, in the sagittal plane 200, and a second redirector 2602 is located at a dorsal portion 340 of the loop 120, in the sagittal plane 200. See FIGS. 1-16, especially FIGS. 1-7.

Preferably, in certain embodiments with a plurality of redirectors, the harness includes a ventral tension force redirector located on the girth loop in the sagittal plane, and a dorsal tension force redirector on the girth loop in the sagittal plane. For example, the ventral and dorsal redirectors can each be a ring that is secured, respectively, to ventral and dorsal portions of the loop, in the sagittal plane.

Further preferably, in some of such embodiments, the path extends circumferentially along the loop, passing through the redirectors and three times through each arc, and the conduit is secured to itself along the path to form a continuous conduit. For example, the path can be within the loop components, passing through the ventral and dorsal redirectors and three times through each arc, with the conduit being continuous along the path.

Other configurations are also contemplated. In various embodiments with a plurality of redirectors, more than two redirectors are contemplated. Further, in various embodiments with a plurality of redirectors, the redirectors can be located at other positions on the loop, including in locations that are not in the sagittal plane. Further, in various embodiments with a plurality of redirectors, and other embodiments, the path can pass only once through each arc, twice through each arc, or more than three times through each arc, or pass through some arcs more or less than through other arcs. Further, in various embodiments with a plurality of redirectors, and other embodiments, the conduit can be secured not to itself but rather or additionally to another part or feature of the harness, or otherwise be secured along the path. Further, in various embodiments, the conduit can be secured in any suitable manner, including without limitation, using stitching, rings, hooks, adhesives, clips, clamps, or any combination of the foregoing. Further, in various embodiments with a plurality of redirectors, and other embodiments, the conduit is not itself continuous but rather cooperates with other components of the harness or is otherwise configured to accomplish a continuous conduit function.

In the third, other alternate, illustrated embodiment, a ventral redirector 2601 and a dorsal redirector 2602 are on the loop 120 in the sagittal plane 200, and the path 240 extends circumferentially along the loop 120, passing through the redirectors 2601,2602 and three times through each arc 1401,1402. Further, the conduit 280 is secured to itself along the path 240 to form a continuous conduit 280. See FIGS. 1-16, especially FIG. 7.

Preferably, in certain embodiments with a plurality of redirectors, with respect to each redirector, each arc has an end proximal to the redirector and an end distal to the redirector. For example, each arc can have two ends, one of which is distal to one of the redirectors but proximal to the other redirector, and the other of which is proximal to the one of the redirectors but distal to the other redirector.

Further preferably, in some of such embodiments, the path has a plurality of branches, each extending, with respect to each redirector, circumferentially along the loop from the redirector to a respective one of the distal ends, back to a respective one of the proximal ends corresponding to the respective distal end, and then back past the respective distal end to the other redirector. For example, the path can extend circumferentially along the loop such that one branch of the path extends from a redirector, along one side of the loop (e.g., a left lateral side), and another branch of the path extends from that redirector, along an opposite other side of the loop (e.g., a right lateral side). Therefore, for example, each branch can extend (1) from a respective redirector, along one side of the loop to an end, distal to the redirector, of the arc on that side of the loop, (2) back to the other end, proximal to the redirector, of that arc, then (3) back past that arc's end that is distal to the redirector, and then (4) to the other redirector.

Other configurations are also contemplated. For example, in various embodiments with a plurality of redirectors, and other embodiments, one or more of the branches can extend circumferentially or otherwise along the loop. Further, in various embodiments with a plurality of redirectors, and other embodiments, one or more of the branches can extend not to distal and proximal ends of arcs, but rather to distal and proximal portions (i.e., not necessarily ends) of arcs. Further, in various embodiments with a plurality of redirectors, and other embodiments, one or more of the branches can extend not from one redirector to another but rather from a redirector to another location on the harness.

In the third, other alternate, illustrated embodiment, with respect to each redirector 2601,2602, each arc 1401,1402 has an end 3601,3602 proximal to the redirector 2601,2602 and an end 3801,3802 distal to the redirector 2601,2602. Further, the path 120 has a plurality of branches 4001,4002, each extending, with respect to each redirector 2601,2602, circumferentially along the loop 120 from the redirector 2601,2602 to a respective one of the distal ends 3801,3802, back to a respective one of the proximal ends 3601,3602 corresponding to the respective distal end 3801,3802, and then back past the respective distal end 3801,3802 to the other redirector 2601,2602. See FIGS. 1-16, especially FIG. 7.

More specifically, in the third, other alternate, illustrated embodiment, branch 4001 of the path 120 extends circumferentially along the loop 120 from redirector 2601 to distal end 3801, back to proximal end 3601, and then back past distal end 3801 to redirector 2602. Similarly specifically, in the third, other alternate, illustrated embodiment, branch 4002 of the path 120 extends circumferentially along the loop 120 from redirector 2602 to distal end 3802, back to proximal end 3602, and then back past distal end 3802 to redirector 2601. See FIGS. 1-16, especially FIG. 7.

Preferably, in certain embodiments, the loop is a neck girth loop and the harness further has a torso girth loop having lateral arcs on opposite sides of and extending in directions substantially parallel to the sagittal plane. Further preferably, in some of such embodiments, each lateral arc has an adjustable length. Further preferably, in some of such embodiments, the loops are connected to one another ventrally and dorsally. For example, the neck girth loop can surround a neck girth of the dog, and the torso girth loop can surround a torso girth of the dog, and each loop can have an arc on either side of the dog that extends in the ventral-dorsal direction, parallel to the sagittal plane. For example, such a configuration can provide accommodation for shoulders and legs of dog. Further, for example, each arc can be adjustable in length. For example, the lengths of the neck girth loop arcs can be adjusted manually to increase in length by pulling the dorsal pad away from the dog (e.g., to loosen or remove the harness), and also adjusted to decrease in length by applying tension to the conduit as described herein. Further, for example, the lengths of the torso girth loop arcs can be adjusted manually to increase in length by loosening the strap of each arc or unclipping clips attaching each strap to itself or to either the dorsal pad or the ventral pad.

Other configurations are also contemplated. Embodiments with one or more loops are contemplated. Further, in various embodiments, one or more of the loops can be doubled, split, or forked loops. Further, in various embodiments, the loops can be of any suitable thickness. Embodiments with loops other than girth loops are contemplated. Embodiments with girth loops other than neck and torso girth loops are contemplated. Further, other configurations of arcs, other locations of arcs on the loop, other locations of arcs relative to the sagittal plane, and other directions in which arcs extend, as discussed above with regard to the neck girth loop, similarly are contemplated as alternate configurations of the torso girth loop and any other loops. Further, in various embodiments, all of the loops are configured for use in shortening arc lengths under a tension force applied to a conduit secured to a path through a redirector on the loop. However, in some embodiments, one or more of the loops are not so configured.

In each of the illustrated embodiments, the loop 120 is a neck girth loop 120, and the harness 100 further comprises a torso girth loop 420 having lateral arcs 4401,4402 on opposite sides 4601,4602 of and extending in directions 4801,4802 substantially parallel to the sagittal plane 200. Each of the lateral arcs 4401,4402 has an adjustable length 5001,5002. The loops 120,420 are connected to one another ventrally and dorsally. See FIGS. 1-16, especially FIGS. 1, 2, 4, 5 and 8-16.

Preferably, in certain embodiments, the redirector is located at a ventral portion of the harness or a dorsal portion of the harness. In some of such embodiments, the redirector can be located on the neck girth loop, the torso girth loop, or adjacent to or between the loops or elsewhere in the sagittal plane. For example, the redirector can be a ring attached to a dorsal portion of the harness behind the neck girth loop.

Other configurations are also contemplated. Embodiments in which one or more redirectors are located on other parts of the harness are contemplated. Further, embodiments in which one or more redirectors are not located in the sagittal plane are contemplated.

In the first illustrated embodiment, the redirector 260 is located at a dorsal portion 340 of the harness 100. In the second, alternate, illustrated embodiment, the redirector 260 is located at a ventral portion 320 of the harness 100. In the third, other alternate, illustrated embodiment, the first redirector 2601 is located at a ventral portion 320 of the harness 100 and the second redirector 2602 is located at a dorsal portion 340 of the harness 100. See FIGS. 1-16, especially FIGS. 3, 6 and 7.

Preferably, in certain embodiments, each arc has an end proximal to the redirector and an end distal to the redirector. For example, each arc can have two ends, one of which is distal to the redirector and the other of which is proximal to the redirector.

Further preferably, in some of such embodiments, the path has a plurality of branches, each extending circumferentially along the loop from the redirector to a respective one of the distal ends and back to a respective one of the proximal ends corresponding to the respective distal end. For example, the path can extend circumferentially along the loop such that one branch of the path extends from the redirector, along one side of the loop (e.g., a left lateral side), and another branch of the path extends from the redirector, along an opposite other side of the loop (e.g., a right lateral side). Therefore, for example, each branch can extend (1) from the redirector, along one side of the loop to an end, distal to the redirector, of the arc on that side of the loop, then (2) back to the other end, proximal to the redirector, of that arc.

Further preferably, in some of such embodiments, when the force is applied, each distal end is pulled toward the proximal end corresponding to the distal end. For example, when the conduit is pulled outwardly through the redirector away from the dog, the tension force passes through the conduit and pulls the distal end toward the proximal end.

Other configurations are also contemplated. In various embodiments, one or more of the branches can extend circumferentially or otherwise along the loop. Further, in various embodiments, one or more of the branches can extend not to distal and proximal ends of arcs, but rather to distal and proximal portions (i.e., not necessarily ends) of arcs.

In the first illustrated embodiment and the second, alternate, illustrated embodiment, each arc 1401,1402 has an end 3601,3602 proximal to the redirector 260 and an end 3801, 3802 distal to the redirector 260. Further, the path 240 has a plurality of branches 4001,4002, each extending circumferentially along the loop 120 from the redirector 260 to a respective one of the distal ends 3801,3802 and back to a respective one of the proximal ends 3601,3602 corresponding to the respective distal end 3801,3802. See FIGS. 1-16, especially FIGS. 1-6.

More specifically, in the first illustrated embodiment and the second, alternate, illustrated embodiment, branch 4001 of the path 120 extends circumferentially along the loop 120 from the redirector 260 to distal end 3801 and back to proximal end 3601. Similarly specifically, in the first illustrated embodiment and the second, alternate, illustrated embodiment, branch 4002 of the path 120 extends circumferentially along the loop 120 from the redirector 260 to distal end 3802 and back to proximal end 3602. See FIGS. 1-16, especially FIGS. 1-6.

Accordingly, in the first illustrated embodiment and the second, alternate, illustrated embodiment, when the tension force (see arrow 300) is applied to the conduit 280 outwardly from the redirector 260, each distal end 3801,3802 is pulled toward the proximal end 3601,3602 corresponding to the distal end 3801,3802. More specifically, in the first illustrated embodiment, when the tension force (see arrow 300) is applied to the conduit 280 outwardly from the redirector 260, distal end 3801 is pulled toward proximal end 3601. Similarly specifically, in the second, alternate, illustrated embodiment, when the tension force (see arrow 300) is applied to the conduit 280 outwardly from the redirector 260, distal end 3802 is pulled toward proximal end 3602. See FIGS. 1-16, especially FIGS. 1-6.

Preferably, in certain embodiments, the conduit is secured to each proximal end, passes through each distal end, and passes through the redirector. For example, the conduit is fixed to the loop at one proximal end, passes through one of the distal ends, passes through the redirector, passes through the other distal end, and is fixed to the loop at the other proximal end.

Other configurations are also contemplated. In various embodiments, the conduit can be secured to other parts of the harness, adjacent to or not adjacent to the proximal ends. Further, in various embodiments, the conduit can be secured in any suitable manner, including without limitation, using stitching, rings, hooks, adhesives, clips, clamps, or any combination of the foregoing. Further, in various embodiments, more than one conduit can be used. Further, in various embodiments, each branch can utilize a separate respective conduit. Further, in various embodiments, multiple conduits can be joined together at, through, or adjacent to the redirector. Further, in various embodiments, the multiple joined conduits can be configured to function as a single conduit.

In the first illustrated embodiment and the second, alternate, illustrated embodiment, the conduit 280 is secured to each proximal end 3601,3602, passes through each distal end 3801,3802, and passes through the redirector 260. See FIGS. 1-16, especially FIGS. 1-6.

Preferably, in certain embodiments, the conduit passes through each proximal end, passes through each distal end, and passes through the redirector, and the conduit is secured to itself along the path to form a continuous conduit. For example, the conduit is not fixed to the loop, but rather is continuous and aligned with the loop along the loop, passing through, under, or over components of the harness.

Other configurations are also contemplated. In various embodiments, more than one conduit can be used. Further, in various embodiments, each branch can utilize a separate respective conduit. Further, in various embodiments, multiple conduits can be joined together at, through, or adjacent to the redirector. Further, in various embodiments, the multiple joined conduits can be configured to function as a single conduit.

In optional versions of the first illustrated embodiment and the second, alternate, illustrated embodiment, the conduit 280 passes through each proximal end 3601,3602, passes through each distal end 3801,3802, and passes through the redirector 260.

Preferably, in certain embodiments, the redirector is a ventral tension force redirector. Further preferably, in some of such embodiments, the harness includes a dorsal tension force redirector on the loop in the sagittal plane. For example, the ventral and dorsal redirectors can each be a ring that is secured, respectively, to ventral and dorsal portions of the loop, in the sagittal plane.

Further preferably, in some of such embodiments, the path extends circumferentially along the loop, passing through the redirectors and three times through each arc. Further preferably, in some of such embodiments, the conduit is secured to itself along the path to form a continuous conduit. For example, the path can be within the loop components, passing through the ventral and dorsal redirectors and three times through each arc, with the conduit being continuous along the path.

Further preferably, in some of such embodiments, each branch extends, with respect to each redirector, circumferentially along the loop from the redirector to a respective one of the distal ends, back to a respective one of the proximal ends corresponding to the respective distal end, and then back past the respective distal end to the other redirector. For example, the path can extend circumferentially along the loop such that one branch of the path extends from a redirector, along one side of the loop (e.g., a left lateral side), and another branch of the path extends from that redirector, along an opposite other side of the loop (e.g., a right lateral side). Therefore, for example, each branch can extend (1) from a respective redirector, along one side of the loop to an end, distal to the redirector, of the arc on that side of the loop, (2) back to the other end, proximal to the redirector, of that arc, then (3) back past that arc's end that is distal to the redirector, and then (4) to the other redirector.

Other configurations are also contemplated. In various embodiments with a plurality of redirectors, more than two redirectors are contemplated. Further, in various embodiments with a plurality of redirectors, the redirectors can be located at other positions on the loop, including in locations that are not in the sagittal plane. Further, in various embodiments with a plurality of redirectors, and other embodiments, the path can pass once through each arc, twice through each arc, three times through each arc, or more than three times through each arc, or pass through some arcs more or less than through other arcs. Further, in various embodiments with a plurality of redirectors, and other embodiments, the conduit can be secured not to itself but rather or additionally to another part or feature of the harness, or otherwise be secured along the path. Further, in various embodiments, the conduit can be secured in any suitable manner, including without limitation, using stitching, rings, hooks, adhesives, clips, clamps, or any combination of the foregoing.

Further, in various embodiments with a plurality of redirectors, and other embodiments, one or more of the branches can extend circumferentially or otherwise along the loop. Further, in various embodiments with a plurality of redirectors, and other embodiments, one or more of the branches can extend not to distal and proximal ends of arcs, but rather to distal and proximal portions (i.e., not necessarily ends) of arcs. Further, in various embodiments with a plurality of redirectors, and other embodiments, one or more of the branches can extend not from one redirector to another but rather from a redirector to another location on the harness.

Further, in various embodiments with a plurality of redirectors, and other embodiments, the conduit is not itself continuous but rather cooperates with other components of the harness or is otherwise configured to accomplish a continuous conduit function.

In the third, other alternate, illustrated embodiment, the first redirector 2601 is located at ventral portion 320 of the loop 120 and the second redirector 2602 is located at dorsal portion 340 of the loop 120. See FIGS. 1-16, especially FIG. 7.

Further in the third, other alternate, illustrated embodiment, the ventral redirector 2601 and dorsal redirector 2602 are on the loop 120 in the sagittal plane 200, and the path 240 extends circumferentially along the loop 120, passing through the redirectors 2601,2602 and twice through each arc 1401,1402. Further, the conduit 280 is secured to itself along the path 240 to form a continuous conduit 280. See FIGS. 1-16, especially FIG. 7.

Further in the third, other alternate, illustrated embodiment, with respect to each redirector 2601,2602, each arc 1401,1402 has an end 3601,3602 proximal to the redirector 2601,2602 and an end 3801,3802 distal to the redirector 2601,2602. Further, the path 120 has a plurality of branches 4001,4002, each extending, with respect to each redirector 2601,2602, circumferentially along the loop 120 from the redirector 2601,2602 to a respective one of the distal ends 3801,3802, back to a respective one of the proximal ends 3601,3602 corresponding to the respective distal end 3801, 3802, and then back past the respective distal end 3801,3802 to the other redirector 2601,2602. See FIGS. 1-16, especially FIG. 7.

More specifically, in the third, other alternate, illustrated embodiment, branch 4001 of the path 120 extends circumferentially along the loop 120 from redirector 2601 to distal end 3801, back to proximal end 3601, and then back past distal end 3801 to redirector 2602. Similarly specifically, in the third, other alternate, illustrated embodiment, branch 4002 of the path 120 extends circumferentially along the loop 120 from redirector 2602 to distal end 3802, back to proximal end 3602, and then back past distal end 3802 to redirector 2601. See FIGS. 1-16, especially FIG. 7.

Accordingly, in the third, other alternate, illustrated embodiment, when the tension force (see arrow 300) is applied to the conduit 280 outwardly from either redirector 2601,2602, each distal end 3801,3802 is pulled toward the proximal end 3601,3602 corresponding to the distal end 3801,3802. More specifically, in the third, other alternate, illustrated embodiment, when the tension force (see arrow 300) is applied to the conduit 280 outwardly from redirector 2601, distal end 3801 is pulled toward proximal end 3601. Similarly specifically, in the third, other alternate, illustrated embodiment, when the tension force (see arrow 300) is applied to the conduit 280 outwardly from redirector 2602, distal end 3802 is pulled toward proximal end 3602. See FIGS. 1-16, especially FIG. 7.

Preferably, in certain embodiments, the conduit passes through the redirector. Further preferably, in some of such embodiments, the harness further comprises a leash coupling through which the conduit passes when passing through the redirector. For example, the leash coupling can be a ring to which a leash can be attached, and the conduit passes through the ring. Further, for example, when the conduit passes through the leash coupling when passing through the redirector, the conduit first enters the redirector, then passes through the leash coupling, and then leaves the redirector.

Other configurations are also contemplated. In various embodiments, the leash coupling can be a ring, clip, hook, strap, magnet, snap, or any other suitable coupling feature or device to which a leash can be connected. Further, in various embodiments, instead of passing through the redirector, the conduit can otherwise suitably interact with, or otherwise meet at a control point on or associated with the redirector.

In the first illustrated embodiment and the second, alternate, illustrated embodiment, the conduit 280 passes through the redirector 260, and the harness 100 further comprises a leash coupling 520 through which the conduit 280 passes when passing through the redirector 260. See FIGS. 1-16, especially FIGS. 1-6.

In the third, other alternate, illustrated embodiment, the conduit 280 passes through each redirector 2601,2602, and the harness 100 further comprises a dorsal leash coupling 5201 through which the conduit 280 passes when passing through redirector 2601 and a ventral leash coupling 5202 through which the conduit 280 passes when passing through redirector 2602. See FIGS. 1-16, especially FIG. 7.

Preferably, the harness can be easily and quickly installed on the dog, by opening the one or more girth loops, passing them over the dog, and fitting the loops to the dog. Further preferably, the harness can be easily and quickly removed from the dog, by again opening the one or more girth loops and passing them over the dog.

Other configurations are also contemplated. In various embodiments, the girth loops can be opened and adjusted in a prescribed order. Further, in various embodiments, the girth loops can be opened and adjusted in any order. Further, in various embodiments, the girth loop components are fully separated from one another when not installed on the dog, and are brought together upon installation and fully separated upon removal. Further, in various embodiments, the girth loop components can, prior to installation and after removal, either be fully separated or partially separated.

Referring to FIGS. 8-16, certain installation, removal, and use methods of the harness are illustrated. While the steps may be described in an order, the invention encompasses use of each step individually, or with or without one or more of the steps or other steps, in various combinations, and in any order.

To place the illustrated harness 100 on the dog, the harness 100 can be fully loosened to open the circumference of the neck girth loop 120 to its maximum size, by manually pulling the dorsal pad 342 and the ventral pad 322 away from one another at the perimeter of the neck girth loop 120. Then, the harness 100 can be slipped onto the dog by passing the neck girth loop 120 over the head and neck of the dog (e.g., passing the head and neck of the dog through the neck girth loop 120). See FIGS. 8 and 9. Then, straps of the lateral arcs 4401,4402 of the torso girth loop 420 can each be secured to itself to form a continuous loop. See FIG. 10. Then, the lateral arcs 4401,4402 of the torso girth loop 420 can be tightened to best fit the dog, by pulling each lateral arc strap to bring the dorsal pad 342 and ventral pad 322 closer together. See FIG. 11. Then, a leash can be coupled to the leash coupling 520 and pulled with a tension force 300 to provide operational slack in the strap 280 before pulling on the straps 280 of the lateral arcs 1401,1402 of the neck girth loop 120 to shorten the lateral arcs 1401,1402 to bring the dorsal pad 342 and ventral pad 322 closer together to best fit the dog under the operational slack condition. See FIGS. 12-13. Then, the harness 100 is ready for operational use to train, exercise, or otherwise handle the dog, with the neck girth loop 120 and the related components of the harness 100 dynamically adjusting the fit of the harness 100 as described herein as tension forces are applied to the leash and pass through the strap 280. See FIG. 14.

To remove the illustrated harness 100 from the dog, the harness 100 can again be fully loosened to open the circumference of the neck girth loop 120 to its maximum size, by manually pulling the dorsal pad 342 and the ventral pad 322 away from one another at the perimeter of the neck girth loop 120. Then, the straps of the lateral arcs 4401,4402 of the torso girth loop 420 can each be released to separate the dorsal pad 342 and ventral pad 322. Then, the harness 100 can be slipped off the dog by passing the neck girth loop 120 over the neck and head of the dog (e.g., passing the neck and head of the dog through the neck girth loop 120). See FIGS. 15 and 16.

Accordingly, a preferred method of using the illustrated harness 100 includes, but is not limited to, one or more of the following steps, in any order: Opening a circumference of the neck girth loop 120 by applying at tension force, to a perimeter of the loop 120 to increase the adjustable lengths 1401,1402; passing the loop 120 over the head and neck of the dog; applying another tension force, to the strap 280 outwardly from the redirector 260 to establish an operational slack of the strap 280; shortening the adjustable lengths 1401,1402 while maintaining the operational slack; and applying and releasing one or more additional tension forces, to the strap 280 outwardly from the redirector 260 while the dog moves, to dynamically adjust the lengths of the lateral arcs 1401,1402 while the dog moves.

Preferably, in certain embodiments, the redirector includes a lock through which the conduit passes. Further preferably, in some of such embodiments, when the lock is in an unlocked configuration, the conduit can be moved through the lock relative to the lock. Further preferably, in some of such embodiments, when the lock is in a locked configuration, the conduit cannot be moved through the lock relative to the lock. For example, the redirector can be a ring secured to the loop in the sagittal plane, and can include a lock that the conduit passes through when or while passing through the redirector. For example, the conduit can enter the redirector, then enter the lock, then exit the lock, then exit the redirector.

Other configurations are also contemplated. In various embodiments, the lock can be or include a clip, clamp, snap, key, or any friction lock, compression lock, tension lock, or any other suitable locking device, mechanism, or feature. Further, in various embodiments, the lock can be separate from or otherwise outside the redirector. Further, in various embodiments, the lock can be a feature of the conduit itself or otherwise on the conduit itself. Further, in various embodiments, the lock can have more than one degree or state of being unlocked, or more than one degree or state of being locked.

In the illustrated embodiments, one or more of the redirectors 260,2601,2602 can include a lock through which the conduit 280 passes. See FIGS. 1-16, especially FIGS. 3, 6 and 7. As an example of a lock contemplated by the present invention, FIGS. 17-26 illustrate a lock 540 configured for use with a redirector 260 that includes a ring 560. When the lock 540 is in an unlocked configuration, the conduit 280 can be moved through the lock 540 relative to the lock 540, and when the lock 540 is in a locked configuration, the conduit 280 cannot be moved through the lock 540 relative to the lock 540.

Preferably, in certain embodiments, when the lock is in the unlocked configuration, the conduit can be moved through the lock relative to the lock in only one direction. For example, in the unlocked configuration, the lock prevents movement of the conduit through the lock relative to the lock in all directions but one.

Other configurations are also contemplated. In various embodiments, in the unlocked configuration, the lock restricts, but does not completely prevent, movement of the conduit through the lock relative to the lock, in one direction, or multiple directions.

When the illustrated lock 540 is in the unlocked configuration, the conduit 280 can be moved through the lock 540 relative to the lock 540 in only one direction, as indicated by arrows 542. See FIGS. 17-26, especially FIGS. 25-26.

Preferably, in certain embodiments, the lock includes an interior channel configured to encourage movement of the conduit therethrough under kinetic force. For example, the interior of the lock has one or more channels through which the conduit passes when passing through the lock, and the channels are angled to encourage movement of the conduit through the channels under kinetic force. For example, when the conduit is under consistent tension and moved back and forth laterally relative to the dog, the angle of the internal channels encourages the conduit to move through the channel. Preferably, each channel is configured, with respect to the entry trajectory of the conduit into the lock, to direct the incoming conduit to turn backwards at an angle of 129.35 degrees before exiting the lock. That is, preferably, each channel is angled 129.35 degrees with respect to the plane defined by the redirector conduit entry and exit points, and thus the channels are angled 78.7 degrees away from one another on either side of the plane perpendicular to the plane defined by the redirector conduit entry and exit points. Angles other than 129.35 degrees are also contemplated, and preferably are between 110 and 140 degrees.

Further preferably, in some of such embodiments, the channel has at least one inwardly directed tooth configured to prevent movement of the conduit through the channel in a direction opposite the one direction. For example, the tooth is shaped to provide friction sufficient to prevent movement of the lock away from the dog. Preferably, a first tooth, proximal to an entrance to the channel, is angled 77.4 degrees or 102.6 degrees normal to the channel. Angles other than 77.4 degrees or 102.6 degrees are also contemplated, and preferably are, respectively, between 75 degrees and 80 degrees or between 100 degrees and 105 degrees. Further, preferably, a second tooth, proximal to an exit of the channel, is angled 72.9 degrees or 107.1 degrees normal to the channel. Angles other than 72.9 degrees or 107.1 degrees are also contemplated, and preferably are, respectively, between 70 and 75 degrees or between 105 and 110 degrees.

Other configurations are also contemplated. In various embodiments, the channel can be of any length, width, diameter, or cross-section shape, and can be directed in any number of straight, angled, or curved trajectories, with one or more segments. Further, in various embodiments, the kinetic force can be generated from movement of the subject to which the harness is attached or movement of the harness itself, and can be intentionally or unintentionally applied. Further, in various embodiments, the tooth can be sharp, rounded, or angled, and one or more teeth can be used in any number of configurations or patterns.

Further, in various embodiments, the channel can be on an outside surface of the lock. Further, in various embodiments, the channel can be controllable, can be opened and closed, or otherwise has one or more aspects that can be moved or adjusted based on a desired level of conduit movement prevention or permission. Further, in various embodiments, the tooth is retractable or controllable, or otherwise has one or more aspects that can be moved or adjusted based on a desired level of conduit movement prevention or permission.

The illustrated lock 540 includes two interior channels 580 configured to encourage movement of the conduit 280 therethrough under kinetic force, and each channel 580 has at least one inwardly directed tooth 600 configured to prevent movement of the conduit 280 through the channel 540 in a direction opposite the one direction. In the illustrated embodiment, each channel 540 first runs parallel to the plane defined by the ring 560, and then turns back, at an angle of 129.35 degrees with respect to the entry trajectory of the conduit 380 into the lock 540, to then exit at the dorsal side of the lock 540. Further in the illustrated embodiment, each channel 580 has a tooth 600, inwardly directed at an angle of 77.4 degrees normal to the channel, near the exit that narrows the channel 580 to provide friction. See FIGS. 17-26, especially FIGS. 25-26.

Preferably, in certain embodiments, when the lock is in the locked configuration, the conduit is prevented from moving through the lock relative to the lock by compression. For example, components of the lock press the conduit between them with enough force to prevent the conduit from moving between the components.

Other configurations are also contemplated. In various embodiments, the compression can be compression of the conduit or of other components. Further, in various embodiments, the compression can be effected by any device, mechanism, feature, or cooperating components. Further, in various embodiments, when the lock is in the locked configuration, the conduit is prevented from moving through the lock relative to the lock by tension, of the conduit or of other components. The tension can be effected by any device, mechanism, feature, or cooperating components.

When the illustrated lock 540 is in the locked configuration, the conduit 280 is prevented from moving through the lock 540 relative to the lock 540 by compression. Components of the lock 540 press the conduit 280 between them to prevent movement of the conduit 280. See FIGS. 17-26, especially FIGS. 25-26.

Preferably, in certain embodiments, the lock has a lower part over which the conduit passes when passing through the lock. Further preferably, in some of such embodiments, the lock has an upper part under at least a portion of which the conduit passes when passing through the lock. For example, the lower part is positioned under the redirector, and the upper part is positioned over the redirector, and the conduit passes between the lower and upper parts.

Further preferably, in some of such embodiments, the lock is in the locked configuration when the upper part is secured adjacent to the lower part. Further preferably, in some of such embodiments, the lock is in the unlocked configuration when the upper part is separated from the lower part. For example, when the lower part and the upper part are brought together under force, the lock is in the locked configuration, and when the lower part and the upper part are separated, the lock is the unlocked configuration.

Other configurations are also contemplated. In various embodiments, each of the lower part and upper part can be or include multiple components. Further, in various embodiments, the conduit passing over or through a part can be any manner of allowance of the conduit within or outside the part. Further, in various embodiments, the securing can be accomplished in any suitable manner, including without limitation, using hooks, adhesives, clips, clamps, snap fits, or any combination of the foregoing. Further, in various embodiments, the lower and upper parts interlock in angled or stepped surfaces as opposed to flat surfaces. Further, in various embodiments, the separation of the parts is a separation only of the locking surfaces or features, but the parts are otherwise connected to remain readily available to engage the lock.

The illustrated lock 540 has a lower part 620 over which the conduit 280 passes when passing through the lock 540, and the lock 540 has an upper part 640 under at least a portion of which the conduit 280 passes when passing through the lock 540. The lock 540 is in the locked configuration when the upper part 640 is secured adjacent to the lower part 620. The lock 540 is in the unlocked configuration when the upper part 640 is separated from the lower part 620. Upwardly directed teeth 622 on the lower part 620 enhance the ability of the lock 540 to prevent movement of the conduit 280 through the lock 540. See FIGS. 17-26, especially FIGS. 20-21 and 25-26.

Accordingly, with regard to the illustrated lock 540, with the upper part 640 and the lower part 620 separated, the conduit 280 can move through the channel 580 relative to the lock 540 under kinetic force. Further accordingly, with regard to the illustrated lock 540, with the upper part 640 and the lower part 620 secured adjacent to one another, the conduit 280 is compressed between the parts 620,640 and therefore cannot move relative to the lock 540. See FIGS. 17-29, especially FIGS. 25-26.

Preferably, in certain embodiments, the upper part is secured to the redirector when the lock is in the locked configuration and when the lock is in the unlocked configuration. Further preferably, in some of such embodiments, the lower part is secured to the redirector when the lock is in the locked configuration, and not secured to the redirector when the lock is in the unlocked configuration. For example, in certain embodiments, the upper part can remain attached to the redirector, and the lower part can be attached to the redirector (and accordingly, secured adjacent to the upper part) to place the lock in the locked configuration, and detached from the redirector (and accordingly, removed away from the upper part) to place the lock in the unlocked configuration.

Other configurations are also contemplated. In various embodiments, all or part of the redirector is not between the upper and lower parts, but rather is situated differently with respect to the upper and lower parts. Further, in various embodiments, the parts of the lock are not upper and lower parts, but right and left parts, top and bottom parts, front and back parts, or otherwise relatively directed cooperating parts.

With regard to the illustrated lock 540, the upper part 640 can be secured to the ring 560 when the lock 540 is in the locked configuration and when the lock 540 is in the unlocked configuration. Further with regard to the illustrated lock 540, the lower part 620 can be secured to the ring 560 when the lock 540 is in the locked configuration, and not secured to the ring 560 when the lock 540 is in the unlocked configuration.

Accordingly, with regard to the illustrated lock 540, with the upper part 640 secured to the ring 560 and the lower part 620 not secured to the ring 560, the conduit 280 can move through the channel 580 relative to the lock 540 under kinetic force. Further accordingly, with regard to the illustrated lock 540, with the upper part 640 secured to the ring 560 and the lower part 620 also secured to the ring 560, the conduit 280 is compressed between the parts 620,640 and therefore cannot move relative to the lock 540. See FIGS. 17-26, especially FIGS. 25-26.

Preferably, in certain embodiments, the lower part is secured to the redirector when the lock is in the locked configuration and when the lock is in the unlocked configuration. Further preferably, in some of such embodiments, the upper part is secured to the redirector when the lock is in the locked configuration, and not secured to the redirector when the lock is in the unlocked configuration. For example, in certain embodiments, the lower part can remain attached to the redirector, and the upper part can be attached to the redirector (and accordingly, secured adjacent to the lower part) to place the lock in the locked configuration, and detached from the redirector (and accordingly, removed away from the lower part) to place the lock in the unlocked configuration.

Other configurations are also contemplated. In various embodiments, all or part of the redirector is not between the upper and lower parts, but rather is situated differently with respect to the upper and lower parts. Further, in various embodiments, the parts of the lock are not upper and lower parts, but right and left parts, top and bottom parts, front and back parts, or otherwise relatively directed cooperating parts.

With regard to the illustrated lock 540, the lower part 620 can be secured to the ring 560 when the lock 540 is in the locked configuration and when the lock 540 is in the unlocked configuration. Further with regard to the illustrated lock 540, the upper 640 can be secured to the ring 560 when the lock 540 is in the locked configuration, and not secured to the ring 560 when the lock 540 is in the unlocked configuration. See FIGS. 17-29, especially FIGS. 25-26.

Accordingly, with regard to the illustrated lock 540, with the lower part 620 secured to the ring 560 and the upper part 640 not secured to the ring 560, the conduit 280 can move through the channel 580 relative to the lock 540 under kinetic force. Further accordingly, with regard to the illustrated lock 540, with the lower part 620 secured to the ring 560 and the upper part 640 also secured to the ring 560, the conduit 280 is compressed between the parts 620,640 and therefore cannot move relative to the lock 540. See FIGS. 17-26, especially FIGS. 25-26.

Preferably, in certain embodiments, the redirector includes a ring, the lower part of the lock is snap fitted to an inner side of the ring, and the upper part of the lock is snap fitted to the inner side of the ring. For example, grooves in the lower and upper parts of the lock allow the diameter of the ring to enter and exit the openings of the grooves under a force greater than kinetic movement forces (e.g., the ring can be pressed by hand into the groove to snap the ring into the groove, but the force required to do so exceeds the forces the ring and grooves will experience during operational use in handling the dog, so that the ring and grooves will not separate under such operational use). Further, for example, the grooves of the lower part and the grooves of the upper part are configured to avoid one another on the ring.

Other configurations are also contemplated. In various embodiments, the snap fit can be accomplished by resilient interacting components, compositions of interacting materials, dimension tolerances, or any other technique, mechanism, or characteristic of interaction between the ring and the parts. Further, in various embodiments, instead of or in addition to a snap fit, attachment of either part to the ring is accomplished by clips, clamps, snaps, hooks, or any friction lock, compression lock, tension lock, or any other suitable locking device, mechanism, or feature. Further, in various embodiments, the redirector is not a ring, but rather is a different shape or has multiple components.

With regard to the illustrated lock 540, the lower part 620 of the lock 540 can snap fit to an inner side 660 of the ring 560, and the upper part 640 of the lock 540 can snap fit to the inner side 660 of the ring 560. Grooves of the lower part 620 are directed parallel to the direction of the conduit 280 so that the conduit 280 can pass under the ring 560 but above the lower part 620 when the upper part 640 is not snap fitted to the inner side 660 of the ring 560. When the upper part 640 is snapped onto the ring 560, and the lower part 620 is snapped onto the ring 560, the conduit 280 is compressed between the parts 620,640 and therefore cannot move relative to the lock 540. See FIGS. 17-26, especially FIGS. 25-26.

Accordingly, with one of the parts 620,640 snapped onto the ring 560, and the other of the parts 620,640 not snapped onto the ring 560, the conduit 280 can move through the channels 580 of the upper part 640 relative to the lock 540 under kinetic force as discussed above. The movement is in only one direction (e.g., movement of the conduit 280 outwardly away from the dog) due to the teeth 600 in the channels 580 preventing movement in the opposite direction. See FIGS. 17-26, especially FIGS. 25-26.

In a configuration in which the upper part 640 is snapped onto the ring 560, and the lower part 620 is not snapped onto the ring 560, the conduit 280 can move through the channels 580 of the upper part 640 relative to the upper part 640 under kinetic force (e.g., caused by movement and leash control of the subject) as discussed above. Further in such a configuration, with an increasing number of kinetic force application incidents, the conduit 280 moves an increasing amount through the upper part 640 without being able to move in the opposite direction, causing a corresponding increasing shortening of the lateral arc lengths, resulting in an optimal fit of the harness 100 to the subject (e.g., the dog) under the specific circumstances. Further, accordingly, optionally, the lock 540 can then be placed into the locked configuration by snapping the lower part 620 onto the ring 560 to lock the lock 540 and thereby preserve the achieved optimal fit. See FIGS. 17-26, especially FIGS. 25-26.

In a configuration in which the lower part 620 is snapped onto the ring 560, and the upper part 640 is not snapped onto the ring 560 but rather is separated from the lower part 620 and positioned close to the leash coupling 520,5201,5202, the conduit 280 can move through the channels 580 of the upper part 640 relative to the upper part 640 under kinetic force (e.g., caused by movement and leash control of the subject) as discussed above. Further in such a configuration, with an increasing number of kinetic force application incidents, the conduit 280 moves an increasing amount through the upper part 640 without being able to move in the opposite direction, causing a movement of the upper part 640 toward the subject (e.g., the dog) and a corresponding increasing shortening of the distance between the upper part 640 and the lower part 620, resulting in relative positions of the various components providing increased control of the subject (e.g., the dog) under the specific circumstances. See FIGS. 17-26, especially FIGS. 25-26.

Figure 27:
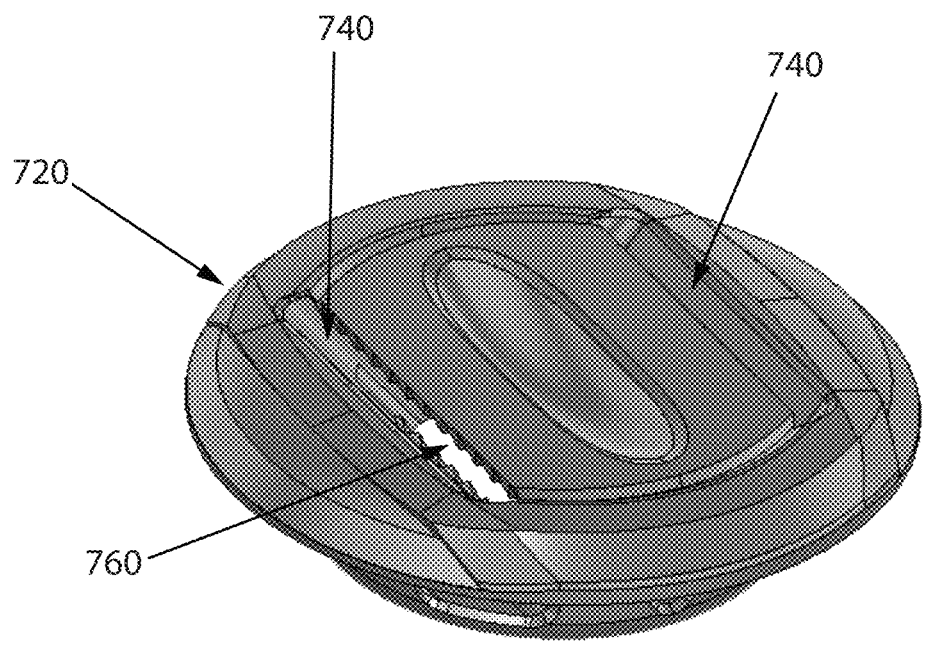
FIGS. 27-30 illustrate a tension controller of certain embodiments of the present invention.
Figure 28:
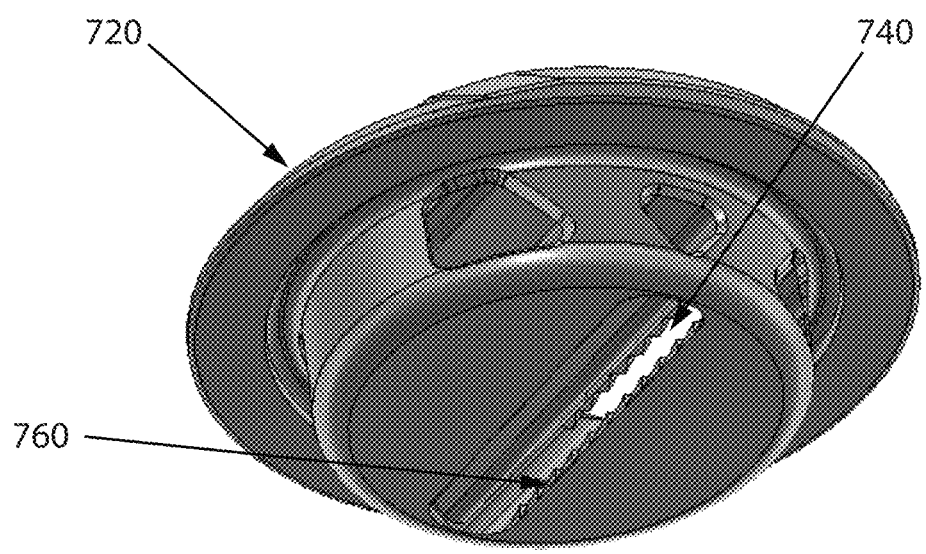

Further with reference to this configuration, the invention contemplates a tension controller, instead of or in addition to a redirector lock, for use with the harness to effect such movement of relative positions of the various components of the harness providing increased control of the dog under the specific circumstances. More particularly, FIGS. 27-28 illustrate an example of a tension controller 720 having internal channels 740 and teeth 760 configured substantially similarly to the channels 580 and teeth 600 of the upper part 640. The illustrated tension controller 720 therefore can be, as described above with regard to the upper part 640, positioned close to the leash coupling 520, between the leash coupling 520 and the redirector 260. In such a configuration, under above described kinetic forces that would be experienced by the conduit 280 and the tension controller 720 during operational use of the harness 100, the tension controller 720 "walks down" toward the redirector 260. That is, under frequent kinetic forces, the conduit 280 moves an increasing amount through the tension controller 720 without being able to move in the opposite direction, causing the tension controller 720 to incrementally move toward the dog, resulting in relative positions of the various components of the harness 100 providing increased control of the dog under the specific circumstances. See FIGS. 17-28, especially FIGS. 25-28.

Further, the invention contemplates that the tension controller can be used with a plurality of harnesses of the invention, or any other leash or other handling system, to provide increased control of multiple subjects (e.g., dogs) under specific circumstances.

Preferably, with regard to such use, in certain embodiments, the tension controller accepts at least one tension force conduit having a plurality of ends each leading, respectively, to a respective subject. For example, embodiments with two channels can accept a single tension force conduit with two branches, each branch leading from a respective subject, that each pass through a respective channel, converging at a leash coupling on a side of the controller proximal to the handler. Further, for example, embodiments with two channels can accept separate tension force conduits, each conduit leading from a respective subject, that each pass through a respective channel and are connected to one another at a leash coupling, or remain separate, on a side of the controller proximal to the handler.

Further preferably, in certain embodiments of the tension controller, each of the channels is configured to encourage movement of the conduit through the channel under kinetic forces similarly as described above with regard to the lock. For example, when the conduit passing through the channel is under consistent tension and moved back and forth laterally relative to the subject, the configuration of the channel encourages the conduit to move through the channel. Preferably, in certain embodiments of the tension controller, each channel is configured, with respect to the entry trajectory of the conduit into the controller, to direct the incoming conduit to turn at an angle of 39.35 degrees before exiting the controller. That is, preferably, each channel is angled 39.35 degrees with respect to the plane defined by the entry direction of the conduit into the controller, and thus the channels are angled 78.7 degrees away from one another on either side of the plane perpendicular to such entry direction. Angles other than 39.35 degrees are also contemplated, and preferably are between 35 degrees and 45 degrees.

Further preferably, in certain embodiments of the tension controller, each channel has at least one inwardly directed tooth configured to prevent movement of the conduit through the channel in a direction opposite the entry direction. For example, the tooth is shaped to provide friction sufficient to prevent movement of the tension controller away from the dog. Preferably, as to each channel, a first tooth, proximal to an entrance to the channel, is angled 77.4 degrees or 102.6 degrees normal to the channel. Angles other than 77.4 degrees or 102.6 degrees are also contemplated, and preferably are, respectively, between 75 degrees and 80 degrees or between 100 degrees and 105 degrees. Further, preferably, as to each channel, a second tooth, proximal to an exit of the channel, is angled 72.9 degrees or 107.1 degrees normal to the channel. Angles other than 72.9 degrees or 107.1 degrees are also contemplated, and preferably are, respectively, between 70 and 75 degrees or between 105 and 110 degrees.

Other configurations are also contemplated. In various embodiments of the tension controller, the controller can include one, two, or more than two channels, and each channel can be of any length, width, diameter, or cross-section shape, and can be directed in any number of straight, angled, or curved trajectories, with one or more segments. Further, in various embodiments of the tension controller, the channels can be completely independent of one another, or can begin, end or otherwise converge at some point, various points, or entirely. Further, in various embodiments of the tension controller, the kinetic forces can be generated from movement of the subjects to which the controller is attached or movement of the controller itself, and can be intentionally or unintentionally applied. Further, in various embodiments of the tension controller, the teeth can be sharp, rounded, or angled, and one or more teeth can be used in any number of configurations or patterns.

Further, in various embodiments of the tension controller, one or more channels can be on an outside surface of the controller. Further, in various embodiments of the tension controller, one or more channels can be controllable, can be opened and closed, or otherwise can have one or more aspects that can be moved or adjusted based on a desired level of conduit movement prevention or permission. Further, in various embodiments of the tension controller, the one or more teeth are retractable or controllable, or otherwise have one or more aspects that can be moved or adjusted based on a desired level of conduit movement prevention or permission.

Figure 30:
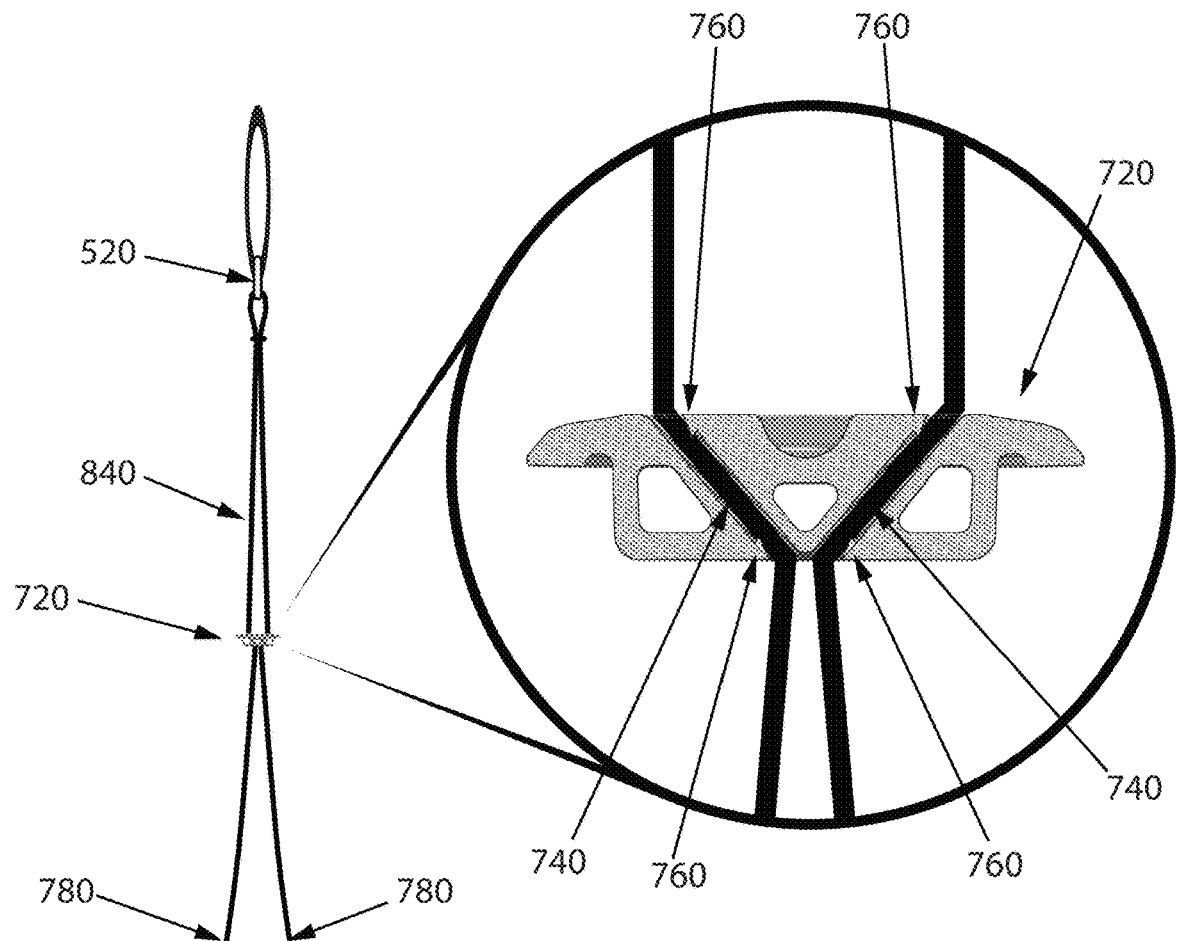
Figure 29:
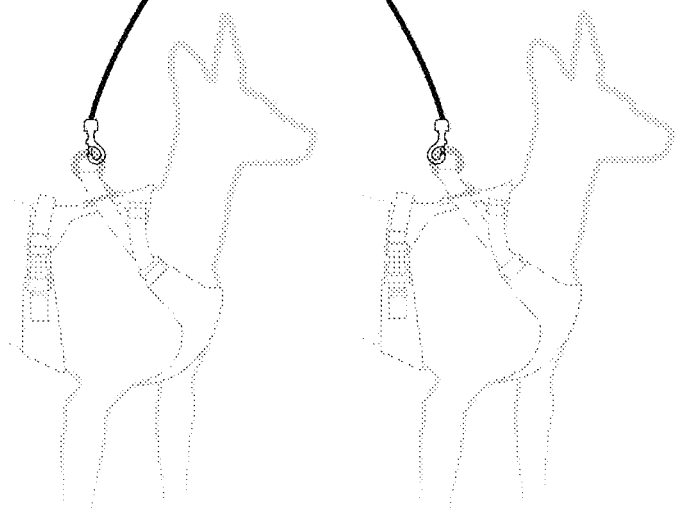

FIGS. 29-30 illustrate an example of a tension controller 720 in use with multiple subjects (e.g., dogs). The tension controller 720 has interior channels 740 and teeth 760 configured substantially similarly to the channels 580 and teeth 600 of the upper part 640 of the lock 540 discussed above. The illustrated controller 720 accepts into one of the channels 740 a first branch 780 of a tension force conduit, or strap 840, from a first dog, and into the other of the channels 740 a second branch 780 of the tension force conduit, or strap 840, from a second dog. The branches 780 converge at a leash coupling 520 on a side of the controller 720 proximal to the handler. Each of the channels 740 is configured to encourage movement, under kinetic force, of the branch 780 passing through it, and each of the channels 740 has at least one inwardly directed tooth 760 configured to prevent movement, in a direction opposite the entry direction, of the branch 780 passing through it. See FIGS. 17-30, especially FIGS. 29-30.

More specifically, in the illustrated tension controller 720, with respect to the entry trajectory of the branches 780 into the controller 720, each of the channels 740 directs the incoming branch 780 to turn at an angle of 39.35 degrees before exiting the controller 720. That is, each channel 740 is angled 39.35 degrees with respect to the plane defined by the entry direction of the branch 780 into the controller 720, and thus the channels 740 are angled 78.7 degrees away from one another on either side of the plane perpendicular to such entry direction. Further specifically, in the illustrated tension controller 720, each channel 740 has a tooth 760, proximal to an exit of the channel 740, that is angled 72.9 degrees or 107.1 degrees normal to the channel 740, that narrows the channel 740 to provide friction. See FIGS. 17-30, especially FIGS. 29-30.

In such a configuration, under the above described kinetic forces experienced by the branches 780 and the tension controller 720 when handling the dogs, the controller 720 "walks down" toward the dogs. That is, under frequent kinetic forces, each of the branches 780 independently moves an increasing amount through the controller 720 without being able to move in the opposite direction, causing the controller 720 to incrementally move toward the dogs, resulting in the dogs being brought closer and closer together, providing increased control of the dogs under the specific circumstances. See FIGS. 17-30, especially FIGS. 29-30.

Preferably, in certain embodiments, the redirector lock includes an accessory attachment feature. For example, the accessory attachment feature can facilitate attachment of desired accessories. Contemplated accessories include, without limitation, smartphones, cameras, lights, and any other device that can complement or otherwise enhance use of the harness or that is otherwise desired to be used with the harness. Further, for example, the accessory attachment feature can be a smooth surface, preferably flat, for facilitating use of adhesive accessory mounts. Further, for example, the accessory attachment feature can be a recess, protrusion, or other shaped surface or component that accepts or otherwise engages with cooperating shapes or components of accessories or accessory mounts. Further, for example, the accessory attachment feature can be a universal mount that accepts or otherwise engages with a standardized cooperating component found on multiple accessories.

Other configurations are also contemplated. In various embodiments, the accessory attachment feature can itself be an attachment or other adapter configured to cooperate with existing standardized mounting systems. Further, in various embodiments, the accessory attachment feature can provide additional functionality for attached accessories, such as, for example, supplying power or providing data storage. Further, in various embodiments, the accessory attachment feature can provide additional functionality to attached accessories, such as, for example, supplying data related to use of the harness, the effectiveness of the harness, the fit of the harness, or any other useful information or data about the harness or the subject.

Figure 31:
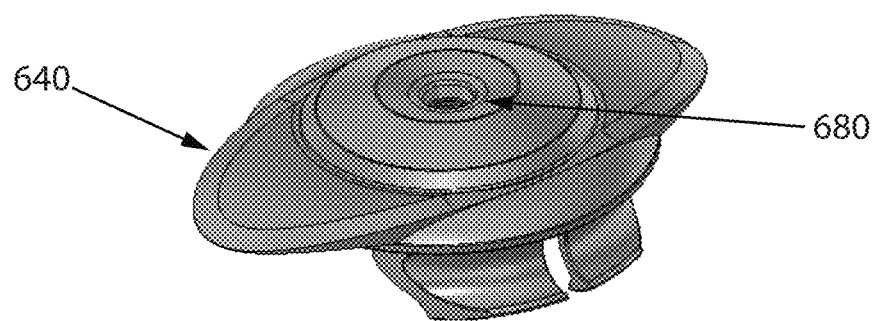
FIGS. 31-33 illustrate an upper part of a redirector lock of a harness of certain embodiments of the present invention, showing accessory attachment features.
Figure 32:
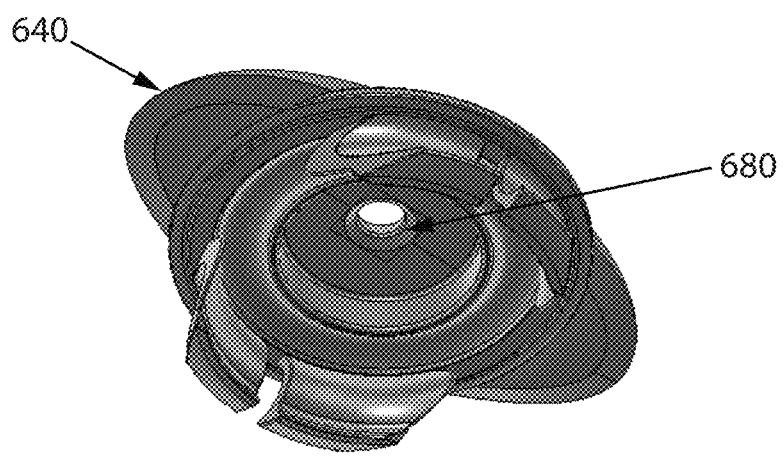
Figure 33:
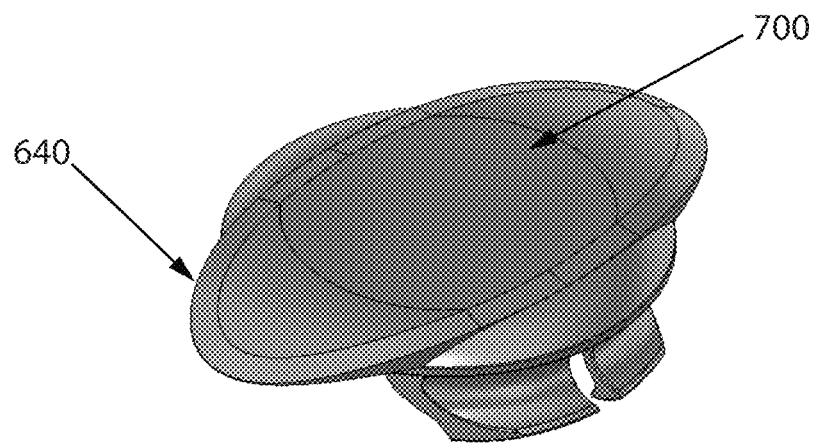

With regard to the upper part 640 illustrated in FIGS. 31-32, the upper part 640 has an accessory attachment recess 680 that serves as a universal mount for accessories that have a standardized cooperating feature that locks into the recess. With regard to the upper part 640 illustrated in FIG. 33, the upper part 640 has an accessory attachment surface 700 that is flat and smooth and accordingly facilitates attachment of accessories to it with adhesives.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A harness defining
a girth loop, the loop having lateral arcs on opposite sides of and extending in directions substantially parallel to a sagittal plane, each having a length, the harness comprising:
a tension force redirector on the loop and in the plane; and
at least one tension force conduit secured along the loop to provide a tension force transfer path within the conduit and extending circumferentially along the loop from the redirector through the arcs; wherein
each arc has an end proximal to the redirector and an end distal to the redirector; and
the path has a plurality of branches, each extending circumferentially along the loop from the redirector to a respective one of the distal ends and back along the loop to a respective one of the proximal ends corresponding to the respective distal end;
such that when a tension force is applied to the conduit outwardly from the redirector, the lengths of the arcs are shortened by each proximal end being pulled toward the distal end corresponding to the proximal end.

2. The harness of claim 1, wherein:
the redirector is located at a ventral portion of the loop or a dorsal portion of the loop.

3. The harness of claim 2, wherein:
the redirector is a ventral tension force redirector;
the harness includes a dorsal tension force redirector on the loop and in the plane;
the path extends circumferentially along the loop, passing through the redirectors and three times through each arc; and
the conduit is secured to itself along the loop to form a continuous conduit.

4. The harness of claim 3, wherein:
with respect to each redirector, each arc has an end proximal to the redirector and an end distal to the redirector; and
the path has a plurality of branches, each extending, with respect to each redirector, circumferentially along the loop from the redirector to a respective one of the distal ends, back along the loop to a respective one of the proximal ends corresponding to the respective distal end, and then back along the loop past the respective distal end to the other redirector.

5. The harness of claim 1, wherein:
the loop is a neck girth loop;
the harness further defines a torso girth loop, the torso girth loop having lateral arcs on opposite sides of and extending in directions substantially parallel to the plane; and
the loops meet one another ventrally and dorsally.

6. The harness of claim 5, wherein:
the redirector is located at a ventral portion of the harness or a dorsal portion of the harness.

7. The harness of claim 1, wherein:
the conduit is secured on the loop at each proximal end, passes through each distal end, and passes through the redirector.

8. The harness of claim 1, wherein:
the conduit passes through each proximal end, passes through each distal end, and passes through the redirector; and
the conduit is secured to itself along the loop to form a continuous conduit.

9. The harness of claim 1, wherein:
the conduit passes through the redirector; and
the harness further comprises a leash coupling through which the conduit passes when passing through the redirector.

10. A harness defining a girth loop, the loop having lateral arcs on opposite sides of and extending in directions substantially parallel to a sagittal plane, each having a length, the harness comprising:
a tension force redirector on the loop and in the plane; and
at least one tension force conduit secured along the loop to provide a tension force transfer path within the conduit and extending circumferentially along the loop from the redirector through the arcs; wherein
when a tension force is applied to the conduit outwardly from the redirector, the lengths of the arcs are shortened;
each arc has an end proximal to the redirector and an end distal to the redirector;
the path has a plurality of branches, each extending circumferentially along the loop from the redirector to a respective one of the distal ends and back along the loop to a respective one of the proximal ends corresponding to the respective distal end;

when the tension force is applied to the conduit outwardly from the redirector, each proximal end is pulled toward the distal end corresponding to the proximal end;

the redirector is a ventral tension force redirector;

the harness includes a dorsal tension force redirector on the loop and in the plane;

the path extends circumferentially along the loop, passing through the redirectors and three times through each arc;

the conduit is secured to itself along the loop to form a continuous conduit; and each branch extends, with respect to each redirector, circumferentially along the loop from the redirector to a respective one of the distal ends, back along the loop to a respective one of the proximal ends corresponding to the respective distal end, and then back along the loop past the respective distal end to the other redirector.

11. A harness defining a girth loop, the loop having lateral arcs on opposite sides of and extending in directions substantially parallel to a sagittal plane, each having a length, the harness comprising:

a tension force redirector on the loop and in the plane; and at least one tension force conduit secured along the loop to provide a tension force transfer path within the conduit and extending circumferentially along the loop from the redirector through the arcs, wherein when a tension force is applied to the conduit outwardly from the redirector, the lengths of the arcs are shortened;

the redirector includes a lock through which the conduit passes;

when the lock is in an unlocked configuration, the conduit can be moved through the lock relative to the lock; and when the lock is in a locked configuration, the conduit cannot be moved through the lock relative to the lock.

12. The harness of claim 11, wherein:

when the lock is in the unlocked configuration, the conduit can be moved through the lock relative to the lock in only one direction.

13. The harness of claim 12, wherein:

the lock includes an interior channel configured to encourage movement of the conduit therethrough under kinetic force; and the channel has at least one inwardly directed tooth configured to prevent movement of the conduit through the channel in a direction opposite the one direction.

14. The harness of claim 11, wherein:

when the lock is in the locked configuration, the conduit is prevented from moving through the lock relative to the lock by compression.

15. The harness of claim 14, wherein:

the lock has a lower part over which the conduit passes when passing through the lock;

the lock has an upper part under at least a portion of which the conduit passes when passing through the lock;

the lock is in the locked configuration when the upper part is secured adjacent to the lower part; and the lock is in the unlocked configuration when the upper part is separated from the lower part.

16. The harness of claim 15, wherein:

the upper part is secured to the redirector when the lock is in the locked configuration and when the lock is in the unlocked configuration; and the lower part is secured to the redirector when the lock is in the locked configuration, and not secured to the redirector when the lock is in the unlocked configuration.

17. The harness of claim 15, wherein:

the lower part is secured to the redirector when the lock is in the locked configuration and when the lock is in the unlocked configuration; and the upper part is secured to the redirector when the lock is in the locked configuration, and not secured to the redirector when the lock is in the unlocked configuration.

18. The harness of claim 17, wherein: the redirector includes a ring;

the lower part of the lock is snap fitted to an inner side of the ring; and the upper part of the lock is snap fitted to the inner side of the ring.

19. A method of using a harness defining a girth loop, the loop having lateral arcs on opposite sides of and extending in directions substantially parallel to a sagittal plane, the harness having a tension force redirector on the loop and in the plane, and at least one tension force conduit secured along the loop to provide a tension force transfer path within the conduit and extending circumferentially along the loop from the redirector through the arcs, the conduit secured along the loop, the method comprising:

opening a circumference of the loop by applying a tension force, to a perimeter of the loop to increase lengths of the arcs;

passing the loop over a head and neck of a subject;

applying another tension force, to the conduit outwardly from the redirector to establish an operational slack of the conduit;

shortening the lengths of the arcs while maintaining the operational slack;

applying and releasing one or more additional tension forces, to the conduit outwardly from the redirector while the subject moves, to dynamically adjust the lengths of the arcs while the subject moves.

* * * * *